US010072628B2

United States Patent
Suzuki et al.

(10) Patent No.: US 10,072,628 B2
(45) Date of Patent: Sep. 11, 2018

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Yusuke Suzuki, Hadano (JP); Susumu Kojima, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 124 days.

(21) Appl. No.: 15/051,041

(22) Filed: Feb. 23, 2016

(65) Prior Publication Data

US 2016/0245206 A1   Aug. 25, 2016

(30) Foreign Application Priority Data

Feb. 25, 2015   (JP) .................................. 2015-034766

(51) Int. Cl.
*F02N 11/08* (2006.01)
*F02N 99/00* (2010.01)
*F02D 41/06* (2006.01)

(52) U.S. Cl.
CPC ...... *F02N 11/0855* (2013.01); *F02N 11/0844* (2013.01); *F02N 99/002* (2013.01);
(Continued)

(58) Field of Classification Search
CPC ............. F02N 11/0844; F02N 11/0855; F02N 11/0814; F02N 11/0818; F02N 11/0822;
(Continued)

(56) References Cited

U.S. PATENT DOCUMENTS

| 9,726,134 | B2 * | 8/2017 | Okabe | .................. F02N 11/0814 |
| 2010/0050970 | A1 * | 3/2010 | Okumoto | ............ F02N 11/0844 |
| | | | | 123/179.4 |
| 2010/0269631 | A1 * | 10/2010 | Niimi | .................... B60W 10/06 |
| | | | | 74/7 E |

(Continued)

FOREIGN PATENT DOCUMENTS

| JP | 2014-077399 A | 5/2014 |
| JP | 2014-185595 A | 10/2014 |
| JP | 2014-202173 A | 10/2014 |
| WO | 2013/031432 A1 | 3/2013 |

*Primary Examiner* — Hai Huynh
*Assistant Examiner* — Gonzalo Laguarda
(74) *Attorney, Agent, or Firm* — Hunton Andrews Kurth LLP

(57) ABSTRACT

A control device for an engine of the invention executes an automatic stop control for stopping stop a rotation of a crank shaft when a predetermined automatic stop condition is satisfied. The device acquires a focused peak value of the engine speed appearing after a time when a rotation direction of the crank shaft first reverses while the automatic stop control has been executed, determines, based on the focused peak value, whether there will be an excessive peak value expected to depart from a predetermined permission range after the focused peak value appears, and executes a starter start control for driving the starter, restarting the fuel supply and igniting the fuel to restart an operation of the engine when a predetermined restart condition is satisfied, the engine speed is within the predetermined permission range and it has been determined that there will be no excessive peak value.

7 Claims, 11 Drawing Sheets

(52) U.S. Cl.
CPC ........ *F02D 41/065* (2013.01); *F02D 2250/06* (2013.01); *F02N 2200/022* (2013.01); *F02N 2200/0801* (2013.01); *F02N 2200/101* (2013.01); *F02N 2200/102* (2013.01); *F02N 2250/04* (2013.01); *Y02T 10/48* (2013.01)

(58) Field of Classification Search
CPC ......... F02N 2200/022; F02N 2200/101; F02N 2200/102; F02N 2200/0801; F02N 2250/04; F02N 2250/06; F02N 99/002; Y02T 10/48; F02D 41/065; F02D 41/042; F02D 41/062
USPC ........... 123/436, 179.3, 179.4; 701/110, 112, 701/113; 73/114.25, 114.59
See application file for complete search history.

(56) References Cited

U.S. PATENT DOCUMENTS

| | | | | |
|---|---|---|---|---|
| 2011/0056450 | A1* | 3/2011 | Notani | F02N 11/0855 123/179.4 |
| 2011/0155085 | A1* | 6/2011 | Hirano | F02N 11/0844 123/179.3 |
| 2013/0289855 | A1* | 10/2013 | Kitano | F02N 11/00 701/113 |
| 2014/0102395 | A1* | 4/2014 | Fujita | F02N 11/0844 123/179.4 |
| 2014/0107903 | A1* | 4/2014 | Kawazu | F02D 41/0097 701/101 |
| 2014/0326208 | A1* | 11/2014 | Shoda | F02N 11/0833 123/179.4 |
| 2014/0345556 | A1* | 11/2014 | Okabe | F02N 11/0844 123/179.16 |

* cited by examiner

CONTROL DEVICE FOR INTERNAL COMBUSTION ENGINE

CROSS-REFERENCE TO RELATED APPLICATION

The present application claims priority to Japanese Patent Application No. 2015-034766 filed on Feb. 25, 2015, which is incorporated herein by reference in its entirety.

BACKGROUND OF THE INVENTION

Field of the Invention

The present invention relates to a control device for an internal combustion engine for automatically stopping and restarting an operation of the engine to achieve an idling stop function, a coasting function and the like.

Description of the Related Art

Conventionally, there is known a technique for automatically stopping an operation of an internal combustion engine (i.e. a technique for automatically stopping a rotation of the engine), for example, for improving a fuel consumption and reducing an amount of an exhaust gas when a vehicle is stopped and/or is decelerated. The engine to which such a technique is applied, is referred to as the engine with an automatic stop function. In general, in order to stop the rotation of the engine by such an automatic stop function, a supply of a fuel to the engine is stopped (see a time t0 in FIG. 1). In this case, the rotation of the engine is not stopped immediately after the fuel supply is stopped and the engine continues to rotate by an inertia for a while.

As illustrated in FIG. 1, when an engine speed approaches to generally zero, a phenomenon that a direction of a rotation of the engine changes repeatedly between normal and reverse rotation directions (i.e., a back-and-forth phenomenon) after a time t1. This phenomenon occurs because a piston positioned in a certain cylinder cannot exceed a compression top dead center due to a compression reaction force in the cylinder and thus, the direction of the rotation of the engine reverses and thereafter, a piston positioned in another cylinder at a combustion stroke is subject to a compression reaction when the piston moves toward the compression top dead center. Then, at a time t2 in FIG. 1, the rotation of the engine is completely stopped. Hereinafter, a period from a time when a process for stopping the rotation of the engine starts by the automatic stop function to a time when the rotation of the engine is completely stopped (i.e., a period from the time t0 to the time t2 in FIG. 1), may be referred to as "the idle period". Further, a period from a time which corresponds to a first reverse time (see the time t1 in FIG. 1) when the direction of the rotation of the engine first changes from a normal rotation direction to a reverse rotation direction during the idle period to a time which corresponds to a complete stop time (see a time t2 in FIG. 1) when the rotation of the engine is completely stopped after the direction of the rotation of the engine changes repeatedly between the normal and reverse rotation directions, may be referred as to "the back-and-forth period".

On the other hand, a restart of the operation of the engine (hereinafter, this restart will be referred to as "the engine restart") is requested, for example, when a driver depresses an accelerator pedal during the idle period. The engine restart is requested at any timing. In general, when the engine restart is requested, the operation of the engine (hereinafter, this operation will be referred to as the engine operation") is restarted by a cranking carried out by a starter motor. In this regard, when a magnitude of the engine speed at the beginning of the cranking is excessively large, a vibration and a noise may be generated. In other words, when the engine speed at the beginning of the cranking is not within a permission range (i.e. a range between a lower limit value L which is a negative value and an upper limit value U which is a positive value) illustrated in FIG. 1, a vibration and a noise may be generated.

In particular, in general, most of the starter motors are of a type that a pinion gear provided at a tip end of a drive shaft of the starter motor is moved to mesh with a ring gear secured on a crank shaft at the beginning of the cranking. In case that such a starter motor is used, when a magnitude of the engine speed is excessively large at the beginning of the cranking, the pinion gear cannot smoothly mesh with the ring gear. As a result, a vibration and a noise are generated and there may be a problem that, for example, damage or wear of the pinion and ring gears may occur. Hereinafter, a problem such as the aforementioned vibration and wear generated due to the start of the cranking carried out by the starter motor in response to the engine restart request during the idle period may be referred to as "the problem at the beginning of the cranking". Note that regarding a starter motor other than the starter motor of the type described above, when a magnitude of the engine speed at the beginning of the cranking is excessively large, the problem at the beginning of the cranking (in particular, the vibration and/or the noise) may occur.

In order to avoid the problem at the beginning of the cranking, the cranking carried out by the starter motor should be started when the engine speed is within the permission range.

Accordingly, a conventional device predicts the engine speed during the idle period by using a "model formula" and controls the cranking carried out by the starter motor on the basis of the result of the prediction (for example, see JP 2014-077399 A).

SUMMARY OF THE INVENTION

However, the model formula used by the conventional device includes various components such as the engine speed, a friction, a compression and an inertia of the engine as terms and thus, a calculation process for predicting the engine speed is complicated and the load of the calculation is large. In addition, the model formula includes an integral term and thus, an error is likely to be accumulated and increased as a period between the present time and a time when the engine speed to be predicted appears is long.

In addition, the model formula includes various components as terms and thus, when the prediction result obtained using the model formula is different from an actual behavior of the engine speed, it is difficult to exactly estimate a degree of an influence of the respective components on the difference between the prediction result and the actual behavior and appropriately correct the model formula. As a result, even when the model formula is corrected on the basis of an actual measured value, the prediction result may be likely to include an error. As a prediction error of the engine speed is large, a possibility of generating the problem at the beginning of the cranking increases.

The present invention is made for solving the problems described above. In particular, one of objects of the present invention is to provide a control device for an internal combustion engine which can quickly restart an operation of the engine by using a starter motor during the idle period while a possibility that the problem at the beginning of the cranking occurs can be reduced.

A control device according to the present invention is applied to an internal combustion engine comprising:

at least a fuel supply device for supplying a fuel into a combustion chamber;

at least an ignition device for igniting the fuel supplied into the combustion chamber;

a crank shaft;

an engine speed detection device for detecting an engine speed which corresponds to a rotation speed of the crank shaft; and a starter for rotating the crank shaft.

Further, the control device according to the present invention comprises an electronic control unit programmed (or configured) to execute an automatic stop control for stopping the supply of the fuel from the fuel supply device to stop a rotation of the crank shaft when a predetermined automatic stop condition is satisfied. For example, the automatic stop condition is satisfied when a brake pedal of a vehicle incorporating the engine is depressed and a vehicle speed is equal to or smaller than a first vehicle speed.

The ECU is programmed (or configured):

to acquire, on the basis of the detected engine speed, a focused peak value which corresponds to an extreme value of the engine speed appearing after a time when a rotation direction of the crank shaft first reverses (i.e., a first reverse time) while the automatic stop control has been executed; and to determine, on the basis of the acquired focused peak value, whether there will be an excessive peak value, which is expected to depart from a predetermined permission range, among predicted peak values each corresponding to an extreme value of the engine speed predicted to appear after the focused peak value appears.

Further, the electronic control unit is programmed (or configured) to execute a starter start control for driving the starter, restarting the supply of the fuel from the fuel supply device and igniting the fuel by the ignition device to restart an operation of the engine when a predetermined restart condition is satisfied, the detected engine speed is within the predetermined permission range and the electronic control unit has determined that there will be no excessive peak value.

Below, there will be described reasons for allowing to reduce a possibility that a problem occurs when a cranking starts as described above and restart the operation of the engine quickly.

FIG. 1 illustrates a time chart showing an example of the back-and-forth phenomenon during the idle period described above. In this example, the automatic stop control starts (i.e., the fuel supply is stopped) at time t0. Therefore, the engine speed gradually decreases after the time t0, reaches an upper limit value of the permission range immediately before a time t1 and reaches zero at the time t1. Further, after the time t1, the rotation of the engine reverses (i.e., the engine speed becomes negative) and the engine speed becomes smaller than a lower limit value of the permission range immediately after the time t1. Then, the engine speed becomes an extreme value (i.e., a minimum value) P1. Then, the engine rotates in a normal rotation direction and the engine speed becomes a next extreme value (i.e., a maximum value) P2. Then, the rotation of the engine reverses again and the engine speed becomes a next extreme value (i.e., a minimum value) P3. Then, in this example, the engine speed converges on zero. In this manner, during the back-and-forth period, the extreme values of the engine speed (or the peak values of the engine speed or the peak engine speeds) appear.

As illustrated in FIG. 1, a magnitude of the extreme value decays during the back-and-forth period. In other words, the magnitude of the extreme value gradually decreases during the back-and-forth period as the number of the appearance of the extreme value increases. Further, the back-and-forth phenomenon corresponds to an oscillating phenomenon generally corresponding to a decay free oscillation of a movable object such as a piston, the crank shaft and the like of the engine subject to a friction. Thus, the magnitude of the extreme value decays exponentially at a generally constant decay rate (=this time extreme value magnitude/last time extreme value magnitude) during the back-and-forth period. Therefore, if a value indicating the decay rate or a degree of the decay (which corresponds to a parameter specifying a manner of the decay of the extreme value and hereinafter, the decay rate or the degree of the decay may be referred to as "decay parameter") in the decay of the magnitude of the extreme value can be realized, the extreme values, each of which will appear at a time other than the aforementioned certain time, can be predicted on the basis of the extreme value at a certain time and the decay parameter.

In addition, for simplifying the description, assuming that the magnitude of the upper limit value of the permission range is the same as the magnitude of the lower limit value of the permission range, when the extreme value appearing at a certain particular time is within the permission range, the extreme values appearing after the particular time are always within the permission range. In other words, for example, in the example illustrated in FIG. 1, the engine speed at the point P2 is within the permission range and thus, the engine speed at the point P3 is always within the permission range. When the extreme value appearing at a certain first time is not within the permission range (see the point P1 in the example illustrated in FIG. 1) and the extreme value appearing at a following second time is within the permission range (see the point P2 in the example illustrated in FIG. 1), the engine speed is always within the permission range after a time (e.g., a time corresponding to a point Q1 in the example illustrated in FIG. 1) when the engine speed becomes within the permission range immediately before the second time. Thus, this time (i.e., the time corresponding to the point Q1) is an earliest time when the engine operation can be restarted without generating the aforementioned problem at the beginning of the cranking. Therefore, the aforementioned object of the present invention can be achieved by starting the cranking by using the starter at a time when the extreme value falls within the permission range.

On the basis of this view, the inventors first carried out a measurement of a manner of the change of the extreme value during the back-and-forth period. A result thereof is illustrated in FIGS. 2 and 3.

FIG. 2 illustrates a graph showing a relationship between the number of the extreme values appearing during the back-and-forth period and the magnitude of the extreme value. From FIG. 2, it can be realized that the extreme value decays at a generally constant decay rate.

FIG. 3 illustrates a graph showing a data shown in the graph of FIG. 2 and normalized by the magnitude of the first appearing extreme value. In particular, FIG. 3 illustrates a graph showing a relationship between the number n of the extreme values appearing during the back-and-forth period and a ratio γ(n) of a magnitude NEP(n) of the n-th appearing extreme value to a magnitude NEP(1) of the first appearing extreme value (γ(n)=NEP(n)/NEP(1)). As can be understood from FIG. 3, the ratio γ(n) linearly decreases in terms of the appearing number n and a manner of the decreasing of the ratio γ(n) (i.e., a rate or gradient of the decreasing of ratio γ(n)) is substantially constant independently of the engine and/or a condition and/or the like. In other words, the relationship between the ratio γ(n) and the appearing number n can be expressed approximately by a linear function indicated by a following expression (1). In the expression (1), −1<a<0.

$$\gamma(n) = GR \cdot n + (1-GR) \quad (1)$$

On the basis of the fact described above, the inventors have realized a following matter. That is, the extreme values during the back-and-forth period can be predicted on the basis of a m-th appearing extreme value X(m) actually acquired and the expression (1) using a gradient GR acquired by an experiment and stored as the decay parameter in the electronic control unit. In other words, for example, when the first appearing extreme value X1 (this value X1 is negative) is detected, the second appearing extreme value X(2) can be predicted by a following expression (2) and the third appearing extreme value X(3) can be predicted by a following expression (3). In other words, the n-th appearing extreme value X(n) can be predicted by a following expression (4)

$$X(2) = |\{\gamma(2) \cdot |X1|\}| = |\{(GR+1) \cdot |X1|\}| \quad (2)$$

$$X(3) = |\{\gamma(3) \cdot |X1|\}| = |\{(2GR+1) \cdot |X1|\}| \quad (3)$$

$$X(n) = (-1)^n \cdot |\{\gamma(n) \cdot |X1|\}| \quad (4)$$

Accordingly, as described above, the control device according to the present invention acquires the focused peak value (e.g., the value of the engine speed at the point P1 in FIG. 1) which corresponds to the extreme value appearing after a time (e.g., the time t1 in FIG. 1, i.e., the first reverse time) when the direction of the rotation of the crank shaft first reverses. Then, for example, the control device according to the present invention predicts extreme values (i.e., the predicted peak values) appearing after the focused peak value appears on the basis of the focused peak value and the expressions (1) and (4), and determines whether there will be an excessive peak value departing from the permission range among the predicted peak values.

Then, the control device according to the present invention starts the starter start control when the predetermined restart condition is satisfied, the detected engine speed is within the permission range and the control device determines that there will be no excessive peak value (see the time at the point Q1 in the example illustrated in FIG. 1). As a result, the control device according to the present invention can restart the engine operation quickly while reducing a possibility that the aforementioned problem at the beginning of the cranking occurs when the control device restarts the engine operation by using the starter during the idle period.

Note that the method for calculating the predicted peak value is not limited to the method which uses the expressions (1) and (4). In other words, for example, there can be employed a method for previously acquiring the decay rate α of the magnitude of the extreme value, previously storing the acquired decay rate α as a decay parameter in the electronic control unit and calculating a predicted peak value on the basis of the acquired focused peak value and the stored decay rate α (see an expression (7) described later). Further, the focused peak value described above is not limited to the first appearing extreme value (i.e., the extreme value appearing first after the first reverse time). In other words, for example, the control device may acquire, as a focused peak value, the extreme value first appearing after the first reverse time and when the control device determines that there will be an excessive peak value among the predicted peak values predicted on the basis of the focused peak value, the control device may execute a similar determination by using, as a new focused peak value, a next extreme value measured (i.e., the second appearing extreme value).

Further, the control device according to the present invention is limited to a method for predicting the predicted peak value on the basis of the focused peak value and the expressions (1) and (4) or the like. In particular, as can be understood from the expressions (1) to (4), the extreme values (i.e., the predicted peak value) appearing after the focused peak value is generally directly defined on the basis of the focused peak value and thus, the control device may determine whether or not there will be an excessive peak value among the predicted peak values on the basis of the focused peak value at the time when the focused peak value is measured actually.

Note that for example, unavoidable delay occurs until the cranking starts actually from the time when the an engine ECU (i.e., an engine electronic control unit) or the like of the control device sends a command of the cranking to the starter. In addition, the delay varies depending on factors such as at least one of the temperatures of the engine and the starter and individual variability of the starter. In particular, the delay is large in the starter of the type for first meshing the pinion gear with the ring gear and then, rotating the crank shaft.

Therefore, even when the engine speed is within the predetermined permission range at a certain time after a restart condition is satisfied and thus, a command for start the cranking by the starter is sent at that certain time, the engine speed may not be within the permission range at a time when the cranking starts actually. As a result, the aforementioned problem at the beginning of the cranking may occur. However, the control device according to the present invention sends a command for carrying out the cranking to the starter at the time when it is ensured that the engine speed is maintained at within the permission range and thus, even when the delay varies, the aforementioned problem at the beginning of the cranking described above may not occur.

The electronic control unit according to an aspect of the present invention may be programmed (or configured):

to previously store a parameter (for example, a decay parameter such as the gradient GR or the delay rate α) for specifying a manner of the delay of the extreme value appearing after the first reverse time; and to calculate the predicted peak values on the basis of the acquired focused peak value and the stored parameter.

As described above, the magnitude of the predicted peak value can be calculated on the basis of the focused peak value and the expressions (1) and (4) or on the basis of the focused peak value and the expressions (1) and (7). Therefore, for example, the gradient GR is previously acquired by an experiment or a simulation or the like and the acquired gradient GR is previously stored in the electronic control unit as a parameter for specifying a manner of the decay of the extreme value appearing after the first reverse time. Then, when the control device according to the present invention acquires a focused peak value, the control device calculates predicted peak values on the basis of the acquired focused peak value and the expressions (1) and (4), to which the stored parameter is applied. Thereby, compared with case that the engine speed during the back-and-forth period is predicted sequentially and continuously, it is possible to calculate the predicted peak values with a simple calculation.

For example, due to the individual variability of the engine, a time degradation of the engine, a property variability of a lubrication oil used in the engine and the like, a difference between a manner of the decay of the magnitude of the actual extreme value and a manner of the decay of the magnitude of the extreme value expressed using the stored parameter may increase.

Accordingly, the electric control unit may be programmed (or configured):

to acquire, on the basis of the detected engine speed, the extreme values of the engine speed appearing after the first reverse time under the state that the starter start control has not been executed;

to correct the stored parameter on the basis of the acquired extreme values; and to store the corrected parameter as a parameter used for calculating the predicted peak values (i.e., to execute a parameter learning).

Thereby, the parameter used for calculating the predicted peak values is corrected depending on the manner of the decay of the magnitude of the actual extreme value. As a result, the predicted peak value can be precisely calculated and thus, it is possible to precisely determine whether or not there will be an excessive peak value.

When the control device according to the present invention determines whether or not there will be an excessive peak value, the control device does not always need to calculate the predicted peak values. In other words, the extreme value decays according to a manner predicted by an experiment or a simulation or the like carried out in advance and thus, it can be said that the magnitude of the predicted peak values after the focused peak value appears are directly defined by the magnitude of the focused peak value. On the other hand, the permission range has been predetermined. Therefore, it is possible to determine whether or not there will be an excessive vale on the basis of whether or not the magnitude of the focused peak value is equal to or larger than a predetermined threshold.

Accordingly, the electronic control unit according to the present invention may be programmed (or configured):

to determine that there will be an excessive peak value when the magnitude of the focused peak value is equal to or larger than a predetermined determination threshold; and to determined that there will be no excessive peak value when the magnitude of the focused peak value is smaller than the predetermined determination threshold.

Thereby, it is possible to determine whether or not there will be an excessive peak value with a simple calculation.

In this case, when the difference between the manner of the decay of the magnitude of the actual extreme value and the predicted manner of the decay of the magnitude of the extreme value increases, decreased is an accuracy of the determination of whether or not there will be an excessive peak value.

Accordingly, the electronic control unit may be programmed (or configured):

to acquire, on the basis of the detected engine speed, the extreme value of the engine speed appearing after the first reverse time under the state that the starter start control has not been executed;

to correct the predetermined determination threshold on the basis of the acquired extreme value; and to store the corrected predetermined determination threshold as a new threshold used for determining whether or not there will be an excessive peak value (i.e., to execute a threshold learning).

Thereby, the determination threshold used for determining whether or not there will be an excessive peak on the basis of the magnitude of the focused peak value is corrected depending on the manner of the decay of the magnitude of the actual extreme value and thus, it is possible to precisely determine whether or not there will be an excessive peak value.

The permission range is not always defined such that a boundary value of the permission range at the side of the normal rotation direction and a boundary value of the permission range at the side of the reverse rotation direction are symmetrical to the engine speed of zero. In other words, the absolute value of the upper limit value which is one of the boundary values defining the permission range and the absolute value of the lower limit value which is one of the boundary values defining the permission range may be the same as each other or may be different from each other. This is because the aforementioned problem at the beginning of the cranking is likely to occur when the crank shaft of the engine rotates in the normal rotation direction, compared with when the crank shaft of the engine rotates in the reverse rotation direction, or vice versa.

Accordingly, when the rotation speed of the crank shaft rotating in the normal rotation direction is expressed by a positive value and the rotation speed of the crank shaft rotating in the reverse rotation direction is expressed by a negative value, the permission range according to an aspect of the present invention may be a range defined by the lower limit value which is a negative value and the upper limit value which is a positive value and the absolute values of the lower and upper limit values may be different from each other.

Thereby, the permission range can be appropriately set and thus, the engine operation can be restarted quickly while a possibility that the aforementioned problem at the beginning of the cranking occurs can be reduced.

When the restart condition is satisfied after the automatic stop control starts (i.e., when the request of the restart of the engine operation is generated), the rotation of the engine may have been already stopped. In this case, the engine speed is within the permission range and thus, even when the cranking by the starter is carried out, the aforementioned problem at the beginning of the cranking does not occur.

Accordingly, the electronic control unit according to an aspect of the present invention may be programmed (or configured) to start the starter start control when the rotation of the crank shaft is stopped and the restart condition is satisfied.

Thereby, the engine operation can be restarted immediately when the restart condition is satisfied under the state that the rotation of the engine is stopped.

On the other hand, under the state that the engine speed is sufficiently high when the predetermined restart condition is satisfied after the automatic stop control starts, the engine operation may be restarted by restarting the fuel supply to the engine without carrying out the cranking by the starter.

Accordingly, the electronic control unit according to an aspect of the present invention may be programmed (or configured) to restart the engine operation by restarting the supply of the fuel by the fuel supply device and igniting the fuel by the ignition device without driving the starter when the restart condition is satisfied under the state that the engine rotates in the normal rotation direction and the magnitude of the engine speed is equal to or larger than a predetermined speed threshold larger than the upper limit value defining the permission range.

Thereby, when the magnitude of the engine speed is sufficiently large, the engine operation can be restarted immediately when the restart condition is satisfied.

The other objects, features and accompanied advantages of the present invention can be understood easily from following descriptions of embodiments according to the present invention with reference to the drawings.

DESCRIPTION OF THE PREFERRED EMBODIMENTS

First Embodiment

Below, a control device for an internal combustion engine according to a first embodiment of the present invention (hereinafter, this control device may be referred to as "the first device") will be described.

(Configuration of Engine)

Figure 4:
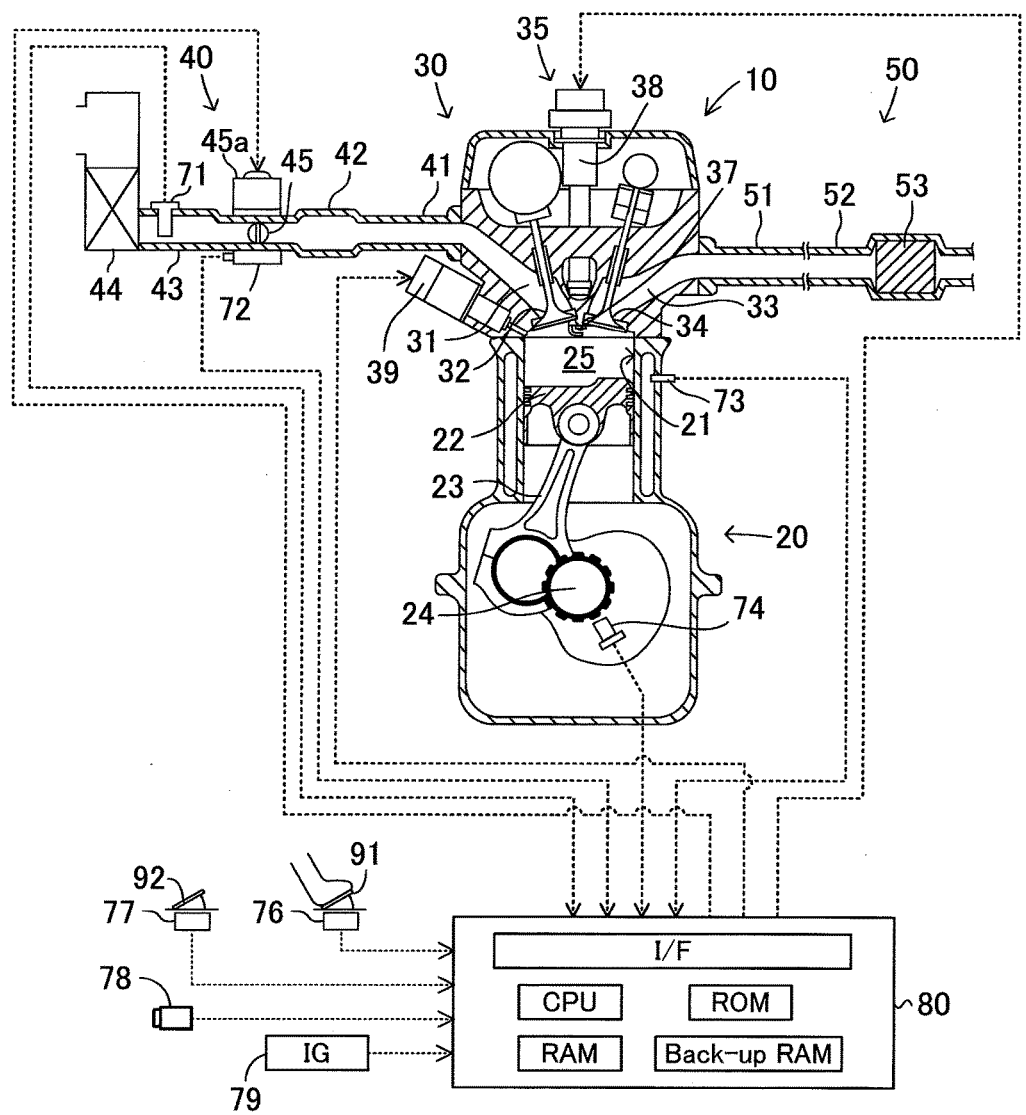
FIG. 4 illustrates a schematic general view of a configuration of the engine, to which a control device (a first device) according to a first embodiment of the present invention is applied.

The first device is applied to an internal combustion engine 10 illustrated in FIG. 4. The engine 10 is a multi-cylinder (in this example, linear four-cylinder) 4-cycle piston-reciprocating incylinder-injection (or direct-injection) spark-ignition type gasoline internal combustion engine.

The engine 10 has a cylinder block part 20 including a cylinder block, a cylinder block lower case, an oil pan and the like, a cylinder head part 30 mounted on the cylinder block part 20, an intake system 40 for supplying an air to the cylinder block part 20 and an exhaust system 50 for discharging an exhaust gas from the cylinder block part 20 to the outside air. Further, as illustrated in FIG. 5, the engine 10 has a fuel supply system 60 for supplying a fuel to the cylinder block part 20.

As illustrated in FIG. 4, the cylinder block part 20 has cylinders 21, pistons 22, connection rods 23 and a crank shaft 24. The piston 22 reciprocally moves in the corresponding cylinder 21. The reciprocal movement of the piston 22 is transmitted to the crank shaft 24 through the corresponding connection rod 23 and thereby, the crank shaft 24 is rotated. Each of the cylinders 21, each of the pistons 22 and the cylinder head part 30 define a combustion chamber (or a cylinder) 25.

Figure 5:
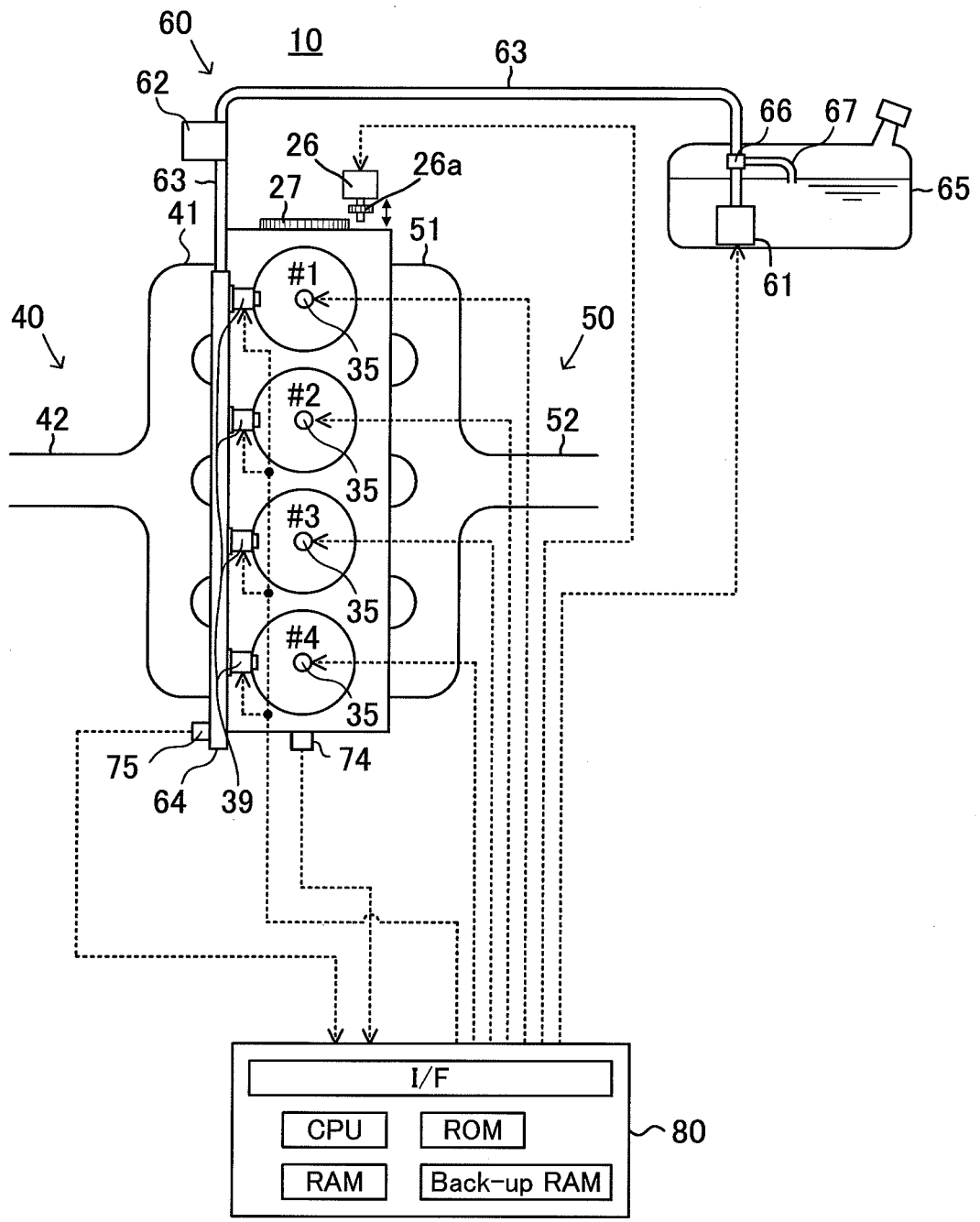
FIG. 5 illustrates a schematic plan view of the engine illustrated in FIG. 4.

Further, as illustrated in FIG. 5, the cylinder block part 20 has a starter motor (or a starter) 26. The starter motor 26 drives in response to a command output from an engine ECU (i.e., electronic control unit) 80 described later. In particular, a ring gear 27 secured to the crank shaft 24 is configured to mesh with a pinion gear 26a and rotate the ring gear 27. In other words, the starter motor 26 is a starter for carrying out a cranking.

Figure 1:
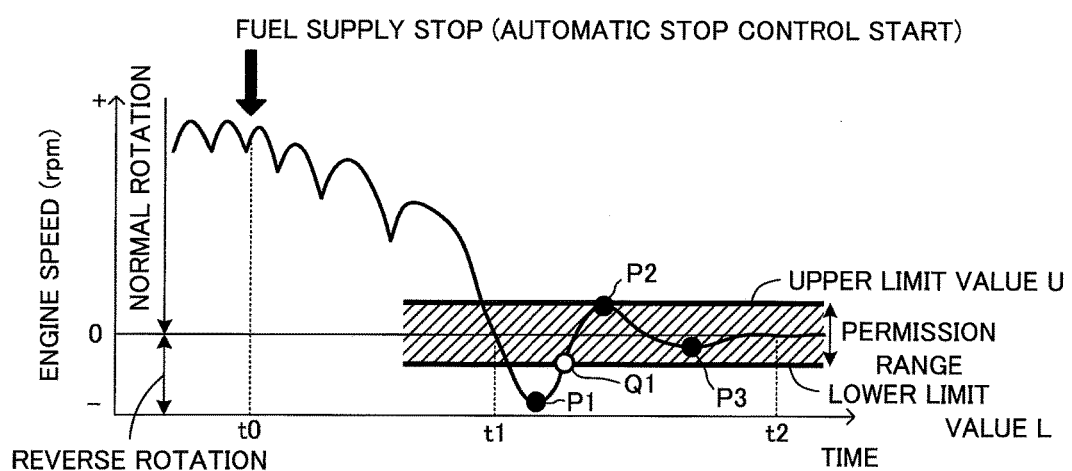
FIG. 1 illustrates a time chart showing an example of a back-and-forth phenomenon during a period (idle period) until a rotation of an internal combustion engine is completely stopped after a process for stopping an operation of the engine by an automatic stop function starts.
Figure 2:
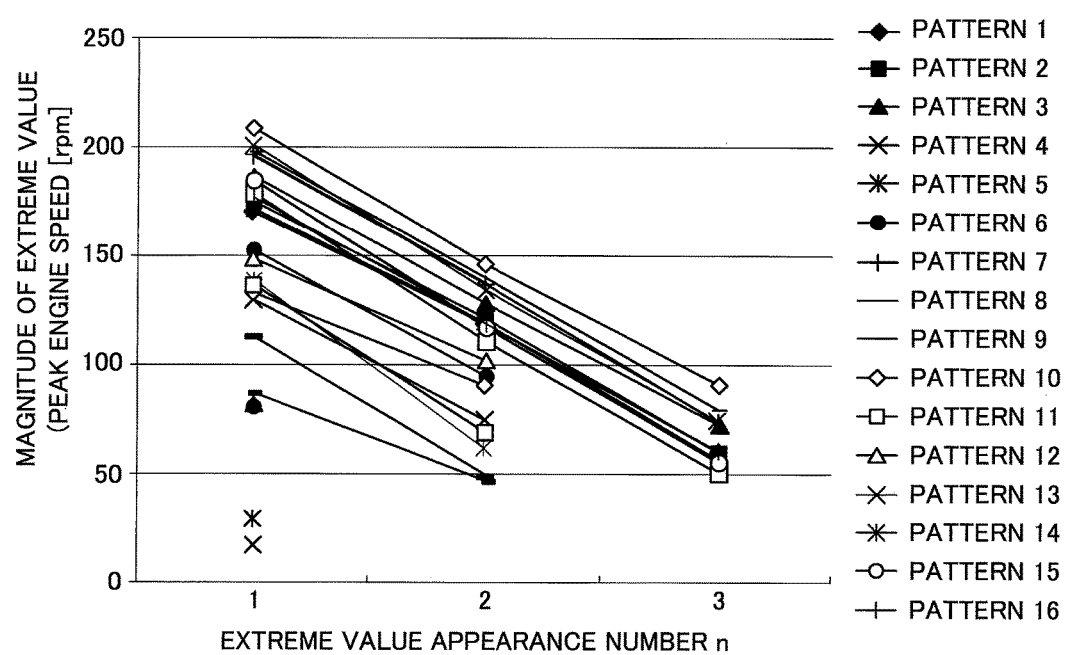
FIG. 2 illustrates a graph showing a relationship between the number of the appearance of the extreme value during the back-and-forth period and the magnitude of the extreme value.
Figure 3:
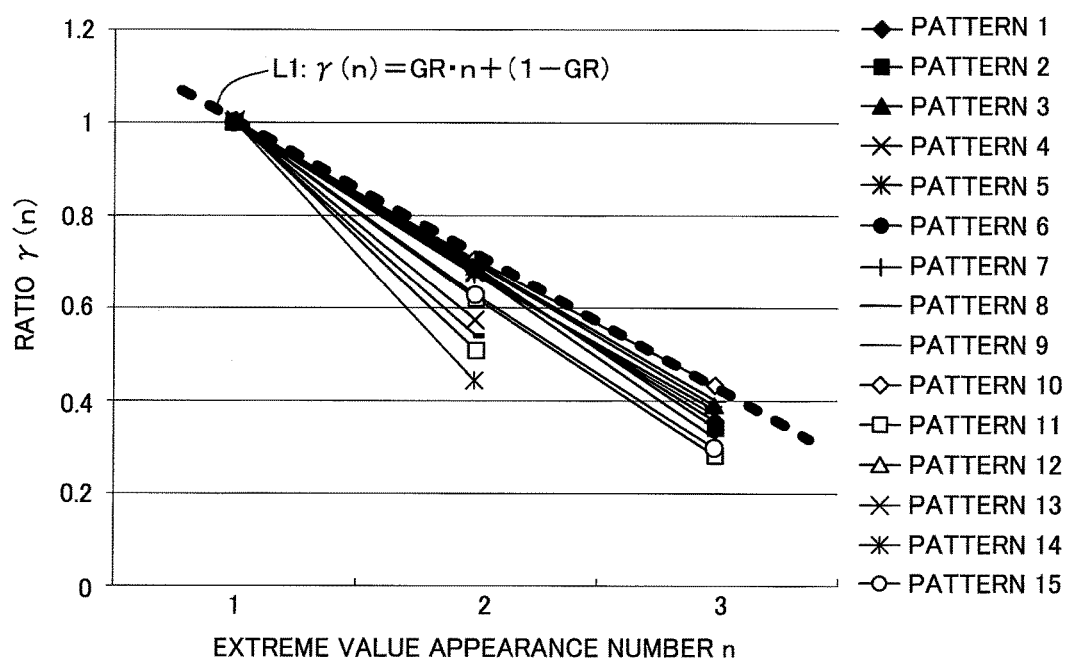
FIG. 3 illustrates a graph showing the data shown in the graph illustrated in FIG. 2 and normalized by the magnitude of the first appearing extreme value.

Again, with reference to FIG. 1, the cylinder head part 30 has intake ports 31, intake valves 32, exhaust ports 33, exhaust valves 34, ignition devices 35 and fuel injectors 39. The intake ports 31 are in communication with the respective combustion chambers 25. The intake valves 32 close and open the respective intake ports 31. The exhaust ports 33 are in communication with the respective combustion chambers 25. The exhaust valves 34 close and open the respective exhaust ports 33. The ignition devices 35 ignite fuel in the respective combustion chambers 25. The fuel injectors 39 inject fuel directly into the respective combustion chambers 25. The fuel injectors 39 constitutes a part of a fuel supply device.

Each of the ignition devices 35 includes an ignition plug 37 and an igniter 38 having an ignition coil for generating high voltage supplied to the ignition plug 37. The igniter 38 is configured to generate high voltage by the ignition coil in response to a command output from the ECU 80 described later. The high voltage is applied to between electrodes of the ignition plug 37 and a spark is generated between the electrodes.

The fuel injectors 39 are provided in the cylinder head part 30 such that fuel injection holes of the fuel injector 39 expose to an interior of the corresponding combustion chamber 25. Each of the fuel injectors 39 is configured to open in response to a command output from the ECU 80 described later to inject fuel directly into the corresponding combustion chamber 25.

The intake system 40 has an intake manifold 41, a surge tank 42 and an intake pipe 43. The intake manifold 41 is in communication with the intake ports 31. The surge tank 42 is in communication with the intake manifold 41. The intake pipe 43 is connected to the surge tank 42 at one end of the intake pipe 43. The intake ports 31, the intake manifold 41, the surge tank 42 and the intake pipe 43 constitute an intake passage.

Further, the intake system 40 has an air filter 44 and a throttle valve 45 provided in the intake pipe 43 in order from the other end of the intake pipe 43 downstream (i.e, toward the surge tank 42) and has a throttle valve actuator 45a for driving the throttle valve 45.

The throttle valve 45 is rotatably supported on the intake pipe 43 and an opening degree of the throttle valve 45 can be adjusted by driving the throttle valve actuator 45a. Thereby, the throttle valve 45 can change a passage cross-sectional area of the intake pipe 43. The opening degree TA of the throttle valve 45 (i.e., the throttle valve opening degree) is defined by a rotation angle from a position of the throttle valve 45 taken when the throttle valve 45 causes the passage cross-sectional area of the intake pipe 43 to become minimum.

The throttle valve actuator 45a includes a DC motor and is configured to drive the throttle valve 45 in response to a command output from the ECU 80 described later.

The exhaust system 50 has an exhaust manifold 51 and an exhaust pipe 53. The exhaust manifold 51 is in communication with the exhaust ports 33. The exhaust pipe 53 is connected to the exhaust manifold 51. The exhaust ports 33, the exhaust manifold 51 and the exhaust pipe 52 constitute an exhaust passage.

Further, the exhaust system 50 has a three-way catalyst 53 provided in the exhaust pipe 52. The three-way catalyst 53 forms a so-called three-way catalyst device (i.e., an exhaust gas purification catalyst) which carries active components comprising a noble metal such as a platinum. The three-way catalyst 53 oxidizes an unburned component such as a HC, a CO, a $H_2$ and the like and reduces an NOx (i.e., a nitrogen oxide) when a gas having a stoichiometric air-fuel ratio flows into the catalyst 53.

Further, the three-way catalyst 53 has an oxygen-adsorbing function for adsorbing or reserving an oxygen therein. The three-way catalyst 53 can purify unburned components and an NOx by the oxygen-adsorbing function even when the air-fuel ratio of the exhaust gas flowing into the three-way catalyst 53 does not correspond to the stoichiometric air-fuel ratio. The oxygen-adsorbing function is derived from a ceria (i.e., $CeO_2$) carried on the three-way catalyst 53.

As illustrated in FIG. 5, the fuel supply system 60 includes two fuel pumps 61 and 62, a fuel delivery pipe 63, a delivery pipe (or an accumulation chamber) 64 and a fuel tank 65. The fuel delivery pipe 63 connects the fuel pump 61 to the delivery pipe 64.

The fuel pump 61 is provided in the fuel tank 65. The fuel pump 61 is driven by an electric motor, which is activated in response to a command output from the ECU 80 described later, to discharge the fuel reserved in the fuel tank 65 to the fuel delivery pipe 63.

The fuel pump 62 is interposed in the fuel delivery pipe 63. The fuel pump 62 is configured to pressurize fuel arriving thereat from the fuel pump 61 through the fuel delivery pipe 63 and supply the pressurized fuel having a high pressure to the delivery pipe 64 through the fuel delivery pipe 63. The fuel pump 62 is activated by a drive shaft rotated in conjunction with the crank shaft 24 of the engine 10.

The fuel pump 62 has an electromagnetic valve not illustrated in a fuel suction part thereof. The electromagnetic valve is opened on the basis of a command output from the ECU 80 described later when a fuel suction operation of the fuel pump 62 is started and closed at a predetermined timing during a fuel pressurizing operation. As the electromagnetic valve is closed early, an effective stroke of a plunger not illustrated of the fuel pump 62 increases and thus, an amount of fuel discharged from the fuel pump 62 increases. As a result, a pressure of the fuel supplied to the fuel injectors 39 increases. In other words, the fuel pump 62 is configured to adjust the pressure of the fuel in the delivery pipe 64 (i.e., a fuel injection pressure or a delivery pipe pressure or a fuel pressure) in response to a command output from the ECU 80 described later.

Further, a relief valve 66 is interposed in the fuel delivery pipe 63 in the fuel tank 65. The relief valve 66 is opened by the pressure of the fuel in the fuel delivery pipe 63 when the pressure of the fuel in the fuel delivery pipe 63 reaches a predetermined pressure. When the relief valve 66 is opened, a part of the fuel discharged from the fuel pump 61 to the fuel delivery pipe 63 is returned to the fuel take 65 through the relief valve 66 and a relief pipe 67 connected to the relief valve 66.

The ECU 80 is an electronic circuit including a known microcomputer and includes a CPU, a ROM, a RAM, a back-up RAM, an interface and the like. The ECU 80 is connected to sensors described later and is configured to receive signals output from the sensors. Further, the ECU 80 is configured to send command signals (or drive signals) to various actuators (e.g., the throttle valve 45a, the ignition devices 35, the fuel injectors 39 and the like).

As illustrated in FIGS. 4 and 5, the ECU 80 is connected to an air-flow meter 71, a throttle position sensor 72, a water temperature sensor 73, a crank angle sensor 74, a fuel pressure sensor 75, an accelerator operation amount sensor 76, a brake switch 77, a vehicle speed sensor 78 and an ignition switch 79.

The air-flow meter 71 is provided on the intake pipe 43. The air-flow meter 71 is configured to measure a mass flow rate of an air (i.e., an intake air amount Ga) flowing therethrough and output a signal indicating the intake air amount Ga.

The throttle position sensor 72 is provided on the intake pipe 43 adjacent to the throttle valve 45. The throttle position sensor 72 is configured to detect an opening degree of the throttle valve 45 (i.e., the throttle valve opening degree TA) and output a signal indicating the throttle valve opening degree TA.

The water temperature sensor 73 is provided in the cylinder block part 20. The water temperature sensor 73 is configured to measure a temperature of a cooling water (i.e., a cooling water temperature THW) for cooling the engine 10 and output a signal indicating the cooling water temperature THW.

The crank angle sensor 74 is provided in the cylinder block part 20. The crank angle sensor 74 is configured to generate a pulse signal every a rotation of the crank shaft 24 by a predetermined constant angle (for example, 10 degrees). The ECU 80 is configured to acquire a crank angle (i.e., an absolute crank angle) of the engine 10 with respect to a compression top dead center of a predetermined cylinder on the basis of the signal output from the crank angle sensor 74 and a signal output from a cam position sensor not illustrated. In addition, the ECU 80 is configured to acquire an engine speed NE on the basis of the signal output from the crank angle sensor 74 (in fact, on the basis of a time period between two adjacent pulse signals).

Note that in this description, a rotation speed of the crank shaft 24 (i.e., the engine 10) rotating in a normal rotation direction is described as a positive value and a rotation speed of the crank shaft 24 (i.e., the engine 10) rotating in a reverse rotation direction is described as a negative value. Further, the ECU 80 is configured to determines that the rotation direction of the crank shaft 24 reverses when the engine speed NE changes from a positive value to a negative value or vice versa.

The fuel pressure sensor 75 (see FIG. 5) is provided on the delivery pipe 64. The fuel pressure sensor 75 is configured to measure a pressure of the fuel (i.e., a fuel pressure PF) supplied to the fuel injectors 39 and output a signal indicating the fuel pressure PF.

The first device controls a command signal to be sent to the fuel pump 62 such that a difference between a target fuel pressure PFtgt and a fuel pressure PF acquired on the basis of an output signal of the fuel pressure sensor 75 reaches zero. For example, when the acquired fuel pressure PF is lower than the target fuel pressure PFtgt, the first device controls a command signal to be sent to the fuel pump 62 such that an amount of the fuel discharged from the fuel pump 62 increases. Thereby, the pressure of the fuel (i.e., the fuel pressure PF) supplied to the fuel injectors 39 increases.

The accelerator operation amount sensor 76 (see FIG. 4) is configured to detect an operation amount Accp of an accelerator pedal 91 and output a signal indicating the operation amount Accp. The brake switch 77 is configured to detect an operation of a brake pedal 92 and output a signal indicating that the brake pedal 92 is operated.

The vehicle speed sensor 78 is configured to measure a speed of a vehicle (i.e., a vehicle speed SPD) which the engine 10 is mounted and output a signal indicating the vehicle speed SPD.

The ignition switch 79 is a switch for operating the engine 10 and stopping the operation of the engine 10 and is configured to send a signal indicating ON/OFF state of the ignition switch 79 to the ECU 80.

(Summary of Operation of First Device)

As illustrated in FIG. 1, the first device actually acquires an extreme value (i.e., a minimum value or a maximum value) of the engine speed NE (see the engine speed NE at a point P1) at a time (i.e., a first reverse time t1) when the rotation direction of the engine 10 changes from the normal rotation direction to the reverse rotation direction after an automatic stop control is started. In addition, the first device calculates, as predicted peak values, future extreme values (e.g., extreme values at points P2 and P3) expected to appear after an extreme value is acquired by using that acquired extreme value (i.e., a focused peak value) and a calculation expression using a parameter (i.e., a decay parameter) for specifying a manner of decay of the extreme value. Then, the first device restarts the operation of the engine 10 by using the starter 26 at a time (e.g., a time corresponding to a point Q1) when it is ensured that there is no predicted peak value departing from a permission range (i.e., there is no excessive peak value) in which no problem at the beginning of the cranking occurs even when a rotation of the engine 10 is started by the starter 26. Below, an operation of the first device will be described in detail.

(Concrete Operation)

1. Automatic Stop and Restart Controls by First Device

First, an automatic stop and restart controls for the engine 10 by the first device will be described. The CPU of the ECU 80 is programmed (or configured) to execute an automatic stop and restart control routine shown by a flowchart illustrated in FIG. 6 with a predetermined time period. At a predetermined timing, the CPU proceeds with the process to a step S601 of FIG. 6 to determine whether or not an automatic stop control has been executed.

In this example, the automatic stop control is executed immediately when a following automatic stop condition is satisfied (i.e., when an automatic stop request is generated).

The automatic stop condition is satisfied when all of following conditions are satisfied. However, the automatic stop conditions are not limited to the following conditions.

(Stop Condition 1) The accelerator pedal 91 is not operated.

(Stop Condition 2) The brake pedal 92 is operated.

(Stop Condition 3) The vehicle speed SPD is equal to or smaller than a predetermined value (i.e., an automatic stop speed threshold).

The automatic stop control is a process for stopping the rotation of the crank shaft 24 (i.e., the rotation of the engine 10) by sending no drive signal to the fuel injectors 39 to stop the supply of the fuel (i.e., the fuel injection) to the engine 10. The automatic stop control is stopped at the same time as the start of various restart control described later.

Figure 7:
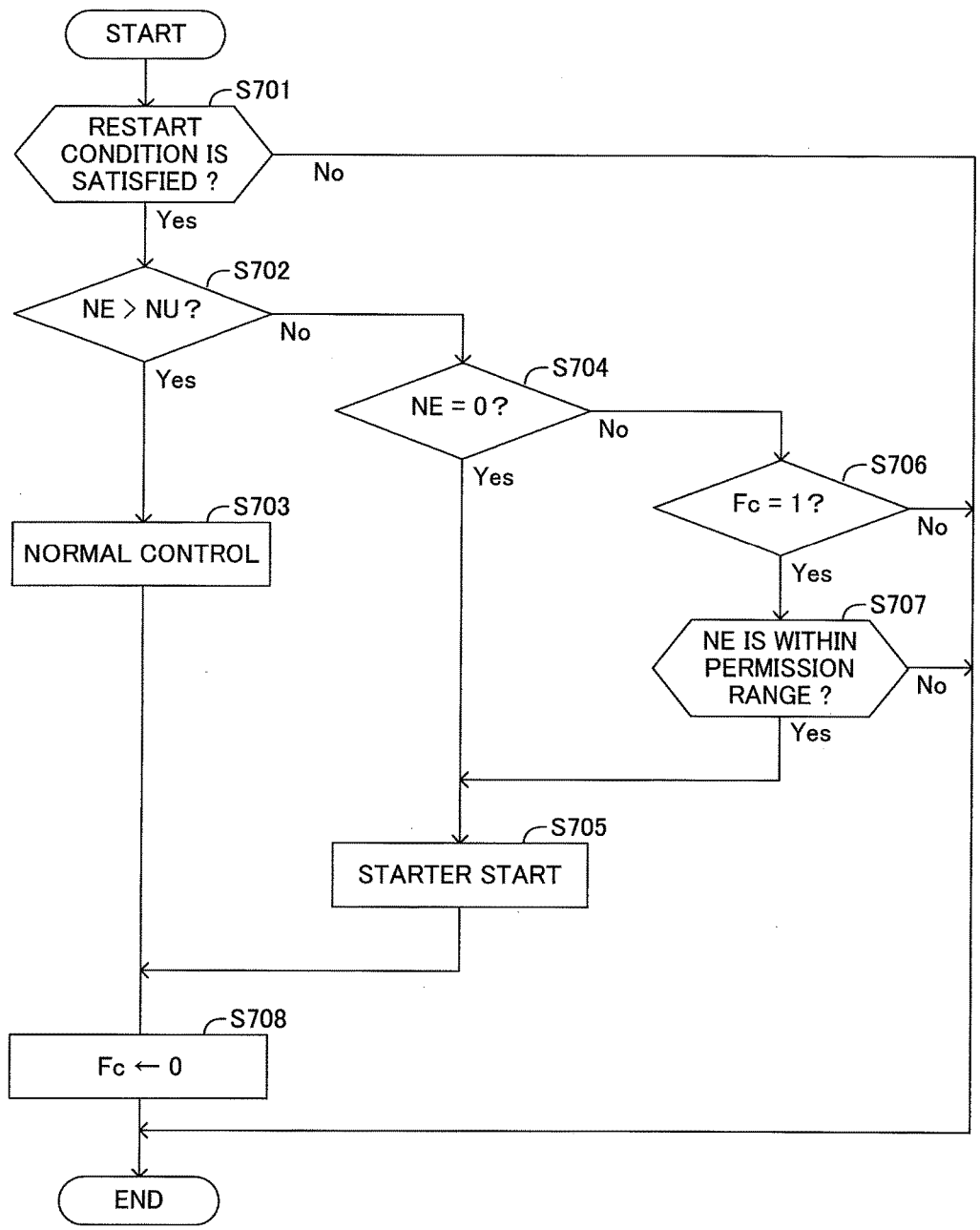
FIG. 7 illustrates a flowchart showing a restart routine executed as a part of the automatic stop/restart control routine.

When the CPU determines that the automatic stop control has been executed at the step S601, the CPU determines "Yes" at the step S601 and proceeds with the process to a next step S602 to execute a restart routine illustrated in FIG. 7 described later. Then, the CPU ends this execution of this routine once.

On the other hand, when the CPU does not determine that the automatic stop control has been executed at the step 601, the CPU determines "No" at the step S601 and proceeds with the process to a next step S603 to determine whether or not the automatic stop condition described above is satisfied.

When the CPU determines that the automatic stop condition is satisfied at the step S603, the CPU determines "Yes" at the step S603 and proceeds with the process to a next step S604 to start the automatic stop control described above. Then, ends this execution of this routine once. Thereby, the engine speed NE gradually decreases. To the contrary, when the CPU does not determine that the automatic stop condition is satisfied at the step S603, the CPU determines "No" at the step S603 and ends this execution of this routine once. As a result, the CPU operates the engine 10 in a normal manner by executing a normal control for continuing the fuel injection and the ignition. In the normal control, the fuel injection is carried out at a latter half of the compression stroke and the ignition is carried out at around the compression top dead center.

Note that the CPU may stop the ignition of the fuel by the ignition device 35 by sending no ignition signal to the ignition device 35 in addition to the stop of the fuel injection in the automatic stop control.

Further, in the normal operation of the engine 10, the CPU changes a target throttle valve opening degree TAtgt such that the target throttle valve opening degree TAtgt increases as the operation amount Accp of the accelerator pedal 91 increases. In addition, the CPU may set a predetermined value as the target throttle valve opening degree TAtgt while the automatic stop control has been executed such that the throttle valve 45 opens at an opening degree of the throttle valve 45 adjacent to a full opening degree. Otherwise, while the automatic stop control has been executed, the CPU may close the throttle valve 45 such that the opening degree of the throttle valve 45 is adjacent to a full closed degree.

2. Various Restart Control by First Device

Next, a restart control of the engine 10 by the first device will be described. As described above, when the CPU proceeds with the process to the step S602 of FIG. 6, the CPU is programmed (or configured) to execute a restart control routine illustrated by a flowchart in FIG. 7. Therefore, when the CPU proceeds with the process to the step S602, the CPU proceeds with the process to a step S701 in FIG. 7 to determine whether or not a restart condition is satisfied (i.e., whether or not a restart request is generated).

In this example, the restart condition is satisfied when all of following conditions are satisfied. However, the restart conditions are not limited to the following conditions.

(Restart Condition 1) The automatic stop control has been executed.

(Restart Condition 2) The brake pedal 92 is not operated.

(Restart Condition 3) The accelerator pedal 91 is operated.

When the CPU determines that the restart condition is satisfied at the step S701, the CPU determines "Yes" at the step S701 and proceeds with the process to a next step S702 to determine whether or not the engine speed NE is larger than a predetermined engine speed threshold NU. In this example, the engine speed threshold NU corresponds to a minimum value of the engine speed NE, at which the operation of the engine 10 can be restarted by the normal control described above. In other words, when the engine speed NE is larger than the engine speed threshold NU, the operation of the engine 10 can be restarted by the normal control. Note that the engine speed threshold NU is larger than an upper limit value U of a permission range described later.

When the CPU determines that the engine speed NE is larger than the engine speed threshold NU at the step S702, the CPU determines "Yes" at the step S702 and proceeds with the process to a next step S703 to execute the normal control. As a result, the operation of the engine 10 is restarted by the normal control. Hereinafter, this restart control may be referred to as the normal restart control. Next, the CPU proceeds with the process to a step S708 to set a value of a flag Fc to "0 (zero)". This flag Fc indicates whether or not a cranking using the starter 26 is permitted. The value of the flag Fc is set to "1" when the CPU determines that there will no excessive peak value (see a step S806 in FIG. 8). Then, the CPU ends this execution of this routine once.

On the other hand, when the CPU determines that the engine speed NE is equal to or smaller than the engine speed threshold NU at the step S702, the CPU determines "Yes" at the step S702 and proceeds with the process to a step S704 to determine whether or not the engine speed NE is zero (i.e., whether or not the operation of the engine 10 has been stopped). Note that this step may be a step for determining that the engine speed NE is zero when the engine speed NE is between a minute positive value NEP and a minute negative value NEN.

When the CPU determines that the engine speed NE is zero at the step S704, the operation of the engine 10 has been stopped. Therefore, the CPU determines "Yes" at the step S704 and proceeds with the process to a next step S705 to rotate the crank shaft 24 by the starter motor 26 to carry out a cranking and to carry out the fuel injection and the ignition at around the compression top dead center to restart the operation of the engine 10. That is, the CPU carries out a starter start (i.e., the CPU executes a starter start control). Then, the CPU proceeds with the process to a next step S708 to set the value of the flag Fc to "0 (zero)" and then, ends this execution of this routine once.

On the other hand, when the CPU does not determine that the engine speed NE is "0 (zero)" at the step S704, the engine 10 is rotating. In this case, the CPU determines "No" at the step S704 and proceeds with the process to a next step S706 to determine whether or not the value of the flag Fc has been set to "1". In other words, the CPU determines whether or not it has been ensured that no excessive peak value will appear in a back-and-forth period of the engine speed NE.

When the CPU determines that the value of the flag Fc has been set to "1" at the step S706, the CPU determines "Yes" at the step S706 and proceeds with the process to a next step S707 to determine whether or not the present engine speed NE is within a predetermined permission range. This permission range corresponds to a range of the engine speed NE, at which the pinion gear 26a can mesh smoothly with the ring gear 27 to allow the starter motor 26 to restart the operation of the engine 10 without generating a vibration and/or a noise and causing the pinion gear 26a and/or the ring gear 27 to be damaged and/or worn. In this example, the permission range is defined as a range between a lower limit value L which is a negative value and an upper limit value U which is a positive value. An absolute value of the lower limit value L is equal to an absolute value of the upper limit value U.

When the CPU determines that the present engine speed NE is within the predetermined permission range at the step S707, the CPU determines "Yes" at the step S707 and proceeds with the process to the next step S705 to rotate the crank shaft 24 by the starter motor 26 to carry out a cranking and carry out the fuel injection and the ignition at around the compression top dead center to restart the operation of the engine 10. In other words, the CPU carries out the starter start (i.e., the CPU executes the starter start control). Then, the CPU proceeds with the process to the step S708 to set the value of the flag Fc to "0 (zero)" and then, ends this execution of this routine once.

On the other hand, when the CPU does not determine that the value of the flag Fc has been set to "1", that is, the CPU determines that the value of the flag Fc has been set to "0 (zero)" at the step S706, it can be estimated that an extreme value of the engine speed NE which will appear in the future will depart from the predetermined permission range. In other words, the flag having a value of "0" means that an extreme value (i.e., a predicted peak value) of the engine speed NE expected as describe later may be an excessive peak value (i.e., a value departing from the permission range). Therefore, in this case, the CPU determines "No" at the S706 and then, ends this execution of this routine once without restarting the operation of the engine 10.

Further, when the value of the flag Fc has been set to "1" and the CPU does not determine that the present engine speed NE is within the predetermined permission range at the step S707 (i.e, the CPU determines "Yes" at the step S706 and "No" at the step S707), a vibration and/or a noise may be generated due to the starter start and the starter motor 26 may be damaged as described above. Therefore, in this case, the CPU ends this execution of this routine once without carrying out the starter start to restart the engine operation.

3. Excessive Peak Determination by First Device (Excessive Peak Determination Section)

Now, an operation of an excessive peak determination section of the first device will be described. The CPU is programmed (or configured) to execute an excessive peak determination routine illustrated by a flowchart in FIG. 8 with a predetermined time period. The value of the flag Fc is set to "1" by this routine.

Figure 8:
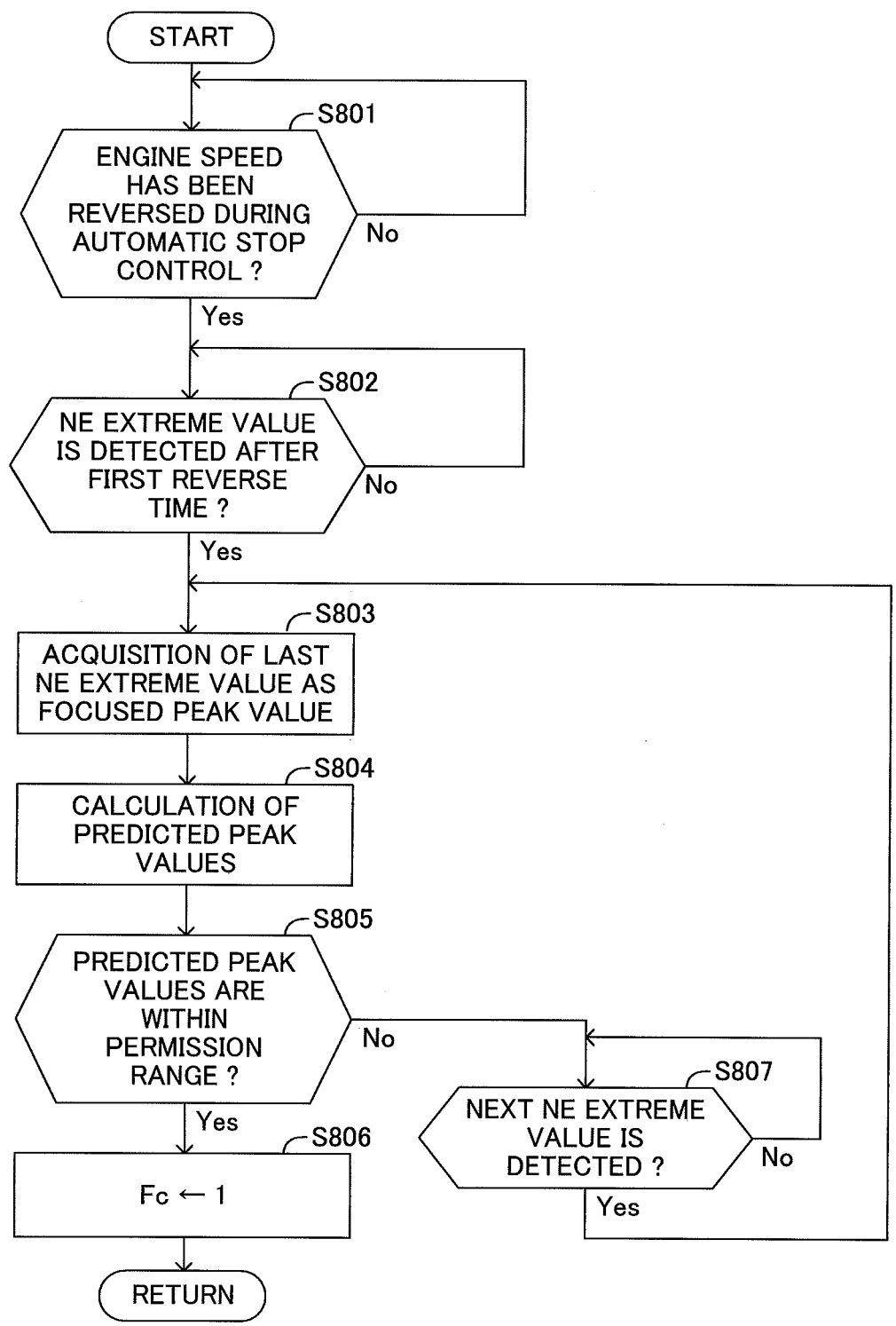
FIG. 8 illustrates a flowchart for describing an operation of an excessive peak determination section of the first device.

At a predetermined timing, the CPU proceeds with the process to a step S801 in FIG. 8 to determine whether or not there is a reverse history that the direction of the rotation of the crank shaft 24 had reversed while the automatic stop control has been executed. A time chart illustrated in FIG. 9(*a*) shows an example that the automatic stop control starts at a time t1 and then, the restart condition is satisfied (i.e. a restart request is generated) at a time t2.

Assuming that the present time is the time t2 (i.e., the time when the restart condition is satisfied), the engine 10 (i.e., the crank shaft 24) rotates in the normal rotation direction and the engine speed NE gradually decreases. Therefore, the direction of the rotation of the crank shaft 24 has not reversed yet. In this case, the CPU determines "No" at the step S801 and the CPU returns the process to the step S801 to wait until the direction of the rotation of the crank shaft 24 reverses.

Figure 9A:
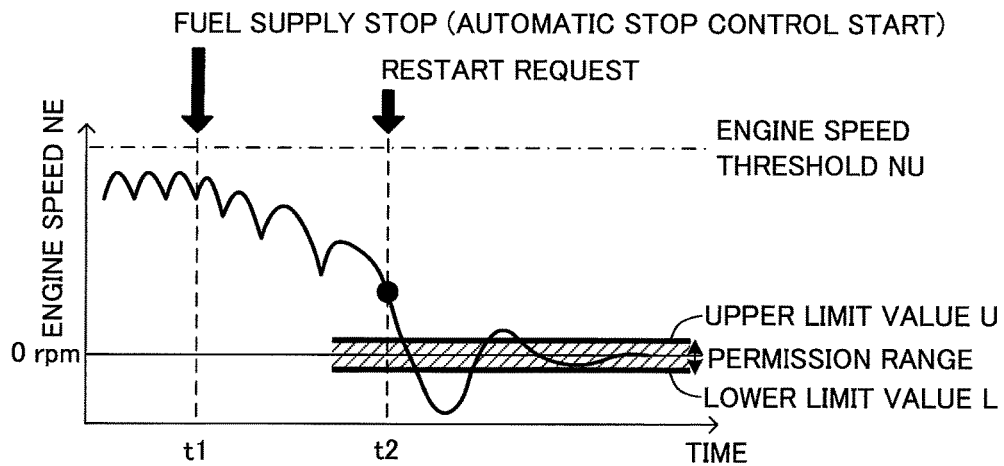
FIG. 9(a) to FIG. 9(c) illustrate a schematic time chart for describing the operation of the excessive peak determination section of the first device.
Figure 9B:
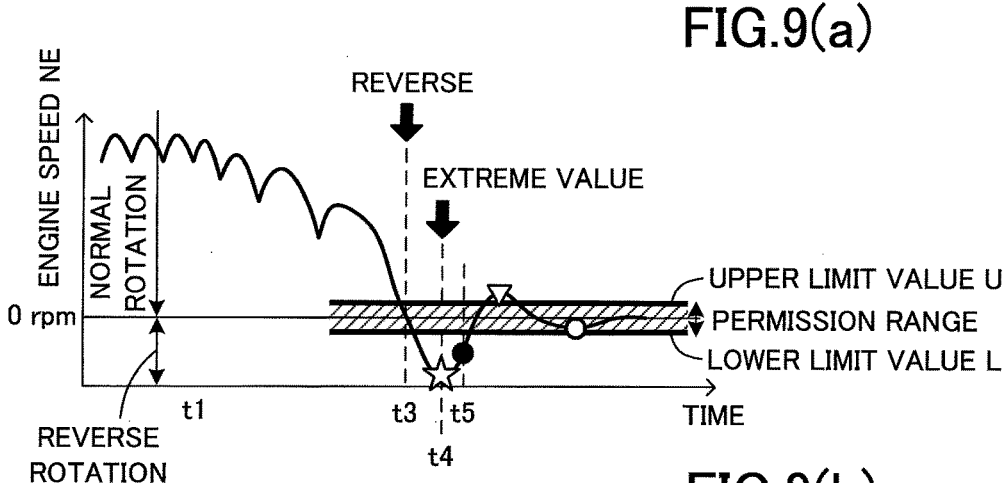

Thereafter, when a predetermined time elapses and a time immediately before a time t3 shown in FIG. 9(b) has come, the engine speed NE corresponds to the upper limit value U. Thereafter, when the time t3 has come, the direction of the rotation of the crank shaft 24 reverses (from the normal rotation direction to the reversed direction). Hereinafter, the time t3, i.e., the time when the direction of the rotation of the engine 10 (i.e., the crank shaft 24) reverses first (from the normal rotation direction to the reverse rotation direction) while the automatic stop control has been executed, will be also referred to as "the first reverse time". After the time t3, there is the reverse history while the automatic stop control has been executed. When this reverse occurs, the CPU determines "Yes" at the step S801 and proceeds with the process to a next step S802 to determine whether or not an extreme value of the engine speed NE has been detected after the first reverse time (e.g., the time t3). When the CPU does not determine that the extreme value of the engine speed NE has been detected at the step S802, the CPU determines "No" at the step S802 and returns the process to the step S802 to wait until the extreme value of the engine speed NE is detected.

A time t4 immediately after the time t3, an extreme value of the engine speed NE (in this case, a minimum value of the engine speed NE and see the engine speed NE at a point denoted by a star sign in FIG. 9(b)) appears. In this case, the CPU detects the extreme value of the engine speed NE. Therefore, the CPU determines "Yes" at the step S802 and proceeds with the process to a step S803 to acquire, as a focused peak value, an extreme value of the engine speed NE detected at a time (e.g., the time t4) immediately before the present time (e.g., a time t5).

Then, the CPU proceeds with the process to a next step S804 to calculate predicted peak values (see the engine speeds at a point denoted by a white inverted triangle sign and a point denoted by a white circle sign in FIG. 9(a) to FIG. 9(c) and each of which is an extreme value of the engine speed NE predicted to be detected later) on the basis of the focused peak value (see the engine speed NE at a point denoted by a star sign in FIG. 9(a) to FIG. 9(c)) acquired at the step S803, the expressions (1) and (4) described above and a decay pattern (i.e., a decay manner of the extreme value defined using a decay parameter for specifying a decay manner of the extreme value) of the extreme value of a predetermined engine speed NE of the engine 10. At this time, the CPU reads a value of a gradient GR stored (or memorized) in the back-up RAM and use the value of the gradient GR for calculation of the predicted peak values.

Figure 9C:
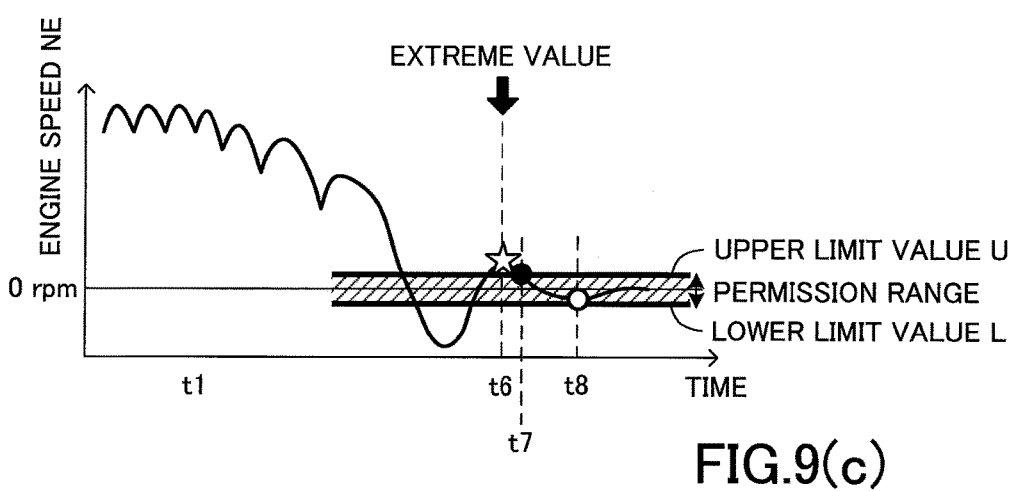

Next, the CPU proceeds with the process to a step S805 to determine whether or not all of the predicted peak values calculated at the step S804 are within the predetermined permission range (which is an area denoted by diagonal lines and a range between the lower and upper limit values L and U in FIG. 9(a) to FIG. 9(c)).

When there is an excessive value, i.e., a predicted peak value departing from the permission range, i.e., the first predicted peak value (see the engine speed NE at a point denoted by a white inverted triangle in FIG. 9(b)), the CPU determines "No" at the step S805 and does not change the value of the flag Fc which indicates whether or not a cranking is permitted. In particular, the CPU proceeds with the process to a step S807 to determine whether or not a next extreme value of the engine speed NE has been detected. When the CPU does not determine that a next extreme value of the engine speed NE has been detected at the step S807, the CPU determines "No" at the step S807 and returns the process to the step S807 to wait until a next extreme value of the engine speed NE is detected.

Note that when the CPU determines that all of the predicted peak values are within the predetermined permission range at the step S805, the CPU determines "Yes" at the S805 and proceeds with the process to a step S806 to set the value of the flag Fc to "1". Then, the CPU ends this execution of this routine once.

When a time t6 illustrated in FIG. 9(c) has come while the CPU is waiting for the detection of a next extreme value of the engine speed NE, a new extreme value of the engine speed NE (see an extreme value of the engine speed NE at a point denoted by a star sign) appears. Thus, the CPU detects the new extreme value of the engine speed NE immediately after the time t6. Therefore, the CPU determines "Yes" at the step S807 and returns the process to the step S803 to acquire, as a new focused peak value, the extreme value of the engine speed NE newly detected. Then, the CPU further calculates a predicted peak value (see the engine speed NE at a point denoted by a white circle sign in FIG. 9(c)) at the step S804.

Note that when the process of the step S804 is carried out with the m-th appearing extreme value X(m) as the focused peak value, a predicted peak value is calculated on the basis of a following expression (5). In the expression (5), Xm=X(m).

$$X(n)=(-1)^n \cdot |\{\gamma(n-m+1) \cdot |Xm|\} \quad (5)$$

In an example illustrated in FIG. 9(c), all of the calculated predicted peak values are within the predetermined permission range. In this case, the CPU determines "Yes" at the step S805 and thus, the CPU proceeds with the process to a next step S806 to set, to "1", the value of the flag Fc which indicates whether or not a cranking is permitted. In other words, it is ensured that the engine speed NE falls within the predetermined permission range after a time t8 when it is predicted that the extreme value of the engine speed NE at a point denoted by a white circle sign in FIG. 9(c) appears. Then, the CPU ends this execution of this routine.

As described above, the execution of this routine causes the CPU to function as an excessive peak determination section. Note that in this example, a time when the value of the flag Fc is set to "1" is the time t6 or the time immediately after the time t6, however, at the time t6, the engine speed NE is not within the permission range and thus, the CPU determines "No" at the step S707 in FIG. 7. Therefore, the starter start control is not started. Then, at a time t7 when the engine speed NE falls within the permission range, the CPU determines "Yes" at the step S707 and as a result, the CPU starts the starter start control.

Figure 6:
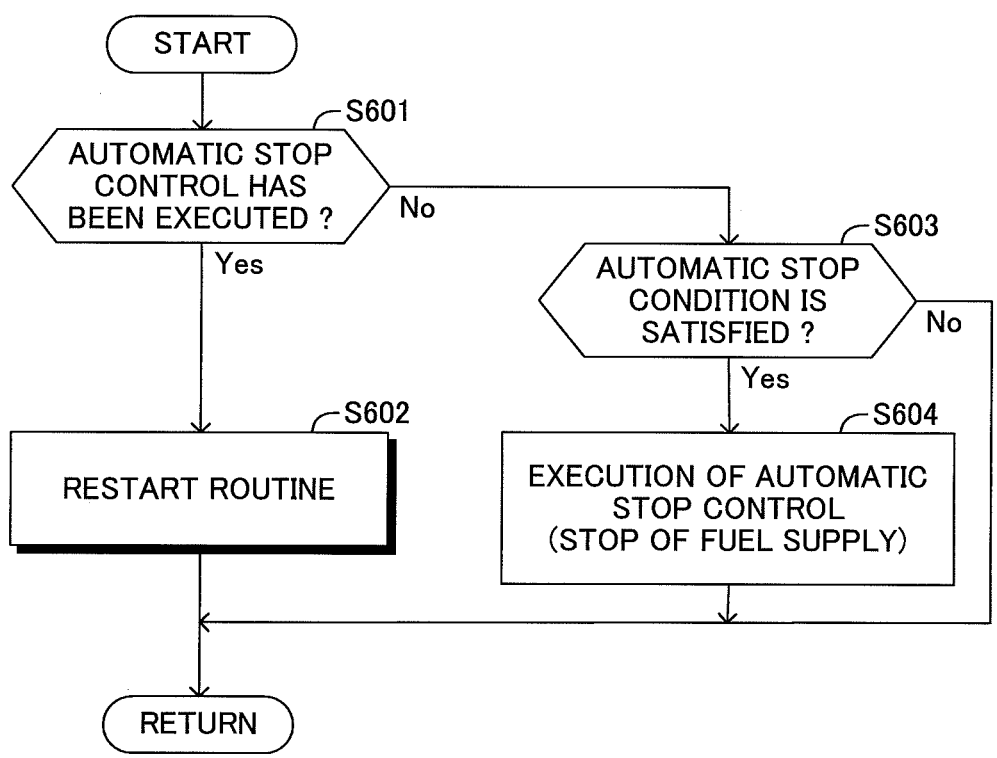
FIG. 6 illustrates a flowchart showing an automatic stop/restart control routine executed by the first device.

As described above, the first device has a control section for executing the automatic stop control (see the ECU 80 and the step S604 in FIG. 6). Further, the control section has an excessive peak determination section for determining whether or not, on the basis of the acquired focused peak value, there will be an excessive peak value departing from a predetermined permission range among predicted peak values each corresponding to an extreme value of the engine speed NE appearing after the focused peak value appears (see the ECU 80 and the routine illustrated in FIG. 8). In addition, the control section has a restart control section for executing a starter start control when it has been determined that there will be no excessive peak value (see the ECU 80 and the steps S705 to S707 in FIG. 7).

Therefore, according to the first device, the restart control (i.e., the starter start control) of the engine 10 is executed by a cranking carried out by the starter motor 26 only after it is ensured that the engine speed NE will continue to be within the permission range. In this case, the first device starts a cranking immediately when the engine speed NE falls within the permission range. As a result, when a predetermined restart condition is satisfied after the supply of the fuel is stopped by the automatic stop control, the first device restarts the operation of the engine 10 promptly while reducing problems such as a generation of vibration and/or noise associated with the cranking carried out by the starter motor 26 and a damage of the starter motor 26.

<First Device According to First Modified Example>

The first device according to a first modified example is the same as the first device according to the first embodiment except for a manner of the calculation of the predicted peak values. Therefore, below, the manner of the calculation of the predicted peak values will be described.

As described above, a magnitude of the extreme value decays exponentially at a generally constant decay rate $\alpha$ (=magnitude of this time extreme value/magnitude of last time extreme value) during the back-and-forth period. In other words, the n-th extreme value $X(n)$ of the engine speed NE appearing after the first reverse time can be expressed by a following expression (6) by using the decay rate ($\alpha$) and the appearing number (n). Note that in the expression (6), $X1=X(1)$.

$$X(n)=(-1)^n \cdot |X1| \cdot \alpha^{(n-1)} \quad (6)$$

Accordingly, the decay rate $\alpha$ is acquired previously as the decay parameter by an experiment, a simulation and the like and is stored/memorized in a data storage device (e.g., back-up RAM) of the ECU 80 according to the first modified example. Then, when the CPU of the ECU 80 executes the process of the step S804 in FIG. 8 for the first time after the first reverse time, the CPU calculates predicted peak values by applying the focused peak value $X1$ acquired at the step S803 and the stored decay rate $\alpha$ to the expression (6).

Note that when the process of the step S804 is carried out with a m-th appearing extreme value $X(m)$ as a focused peak value, the predicted peak value is calculated on the basis of a following expression (7). In the expression (7), $Xm=X(m)$.

$$X(n)=(-1)^n \cdot |Xm| \cdot \alpha^{(n-m)} \quad (7)$$

<First Device According to Second Modified Example>

The first device according to a second modified example is the same as the first device according to the first embodiment except that the decay parameter is learned by the first device according to the second modified example. Therefore, below, the learning of the decay parameter will be described.

Due to an individual variability of the engine 10, a time degradation of the engine 10, a property variability of a lubrication oil used in the engine 10 and the like, a difference between a manner of the decay of the magnitude of the actual extreme value and a manner of the decay of the magnitude of the extreme value (see the expressions (1) and (5)) expressed using the stored parameter (the gradient GR as the decay parameter) may increase.

Accordingly, the CPU according to this second modified example is programmed (or configured) to execute a separate routine not illustrated to acquire various extreme values of the engine speed NE until the operation of the engine 10 is completely stopped by the automatic stop control, associating with the appearing number and store the acquired extreme values in the RAM. Then, the CPU executes a parameter learning for correcting (or amending) the decay parameter on the basis of the stored data.

In particular, the CPU newly acquires a value GR' corresponding to the gradient GR of the expression (1) on the basis of the data stored in the RAM. Then, the CPU corrects the gradient GR stored in the back-up RAM at the present time by the value GR' and memorizes/stores the corrected value GRnew as a new gradient GR in the bake-up RAM. In particular, the CPU acquires a corrected value GRnew by a following expression (8). In the expression (8), x is a weight coefficient and is a positive value which is equal to or smaller than 1.

$$GAnew=(1-x) \cdot GA + x \cdot GA' \quad (8)$$

Note that the weight coefficient x can be suitably defined on the basis of a reliability of the extreme value of the engine speed NE newly detected for the aforementioned learning of the decay parameter and the like. For example, if the extreme value is an extreme value acquired when the appearing number of the extreme value from the first reverse time t0 an engine operation complete stop time is extremely small, the extreme value may be highly an extreme value acquired when the operation of the engine 10 is rapidly stopped due to any causes. Therefore, when the number of the extreme values of the engine speed NE newly detected for the aforementioned leaning of the decay parameter during the back-and-forth period is smaller than a predetermined number, the CPU according to the second modified example desirably sets a weight coefficient x to a value smaller than a weight coefficient x set when the number is equal to or larger than the predetermined number.

Further, when the magnitude of the extreme value of the engine speed NE detected by an engine speed detection section (the crank angle sensor 74 and the ECU 80) is extremely small, the detected extreme value does not correspond to the actual extreme value and, for example, may be an extreme value wrongly detected due to a detection accuracy of the engine speed NE and/or a noise of the crank angle sensor 74. Therefore, when an absolute value of the engine speed NE newly detected for executing the learning described above is smaller than a predetermined value, the CPU according to the second modified example desirably sets a weight coefficient x smaller than a weight coefficient set when the absolute value is equal to or larger than the predetermined value.

<First Device According to Third Modified Example>

Similar to the first device according to the second modified example, the first device according to a third modified example is the same as the first device according to the first modified example except that the decay parameter (i.e., the decay rate $\alpha$) used in the first device according to the first modified example is learned by the first device according to the second modified example. Therefore, the leaning of the decay parameter will be described.

The CPU according to the third modified example executes a routine not illustrated to acquire the actual extreme values of the engine speed NE associating with the appearing number when the operation of the engine 10 is completely stopped by the automatic stop control and stores the acquired extreme values in the RAM. Then, the CPU executes a parameter learning for correcting (or amending) the decay rate $\alpha$ on the basis of the stored data.

In particular, the CPU newly acquires a value α' corresponding to the decay rate α of the expression (7) on the basis of the data stored in the RAM. Then, the CPU corrects the decay rate α stored at the present time in the back-up RAM by the value α' and memorizes/stores the corrected value αnew as a new decay rate α in the back-up RAM. In particular, the CPU calculates a corrected value anew by a following expression (9). In the expression (9), y is a weight coefficient and is a positive value equal to or smaller than 1. The weight coefficient y may be set and/or changed similar to the first device according to the second modified example.

$$\alpha new = (1-y) \cdot \alpha + y \cdot \alpha' \qquad (9)$$

<First Device According to Fourth Modified Example>

In the first device according to the first embodiment, the absolute values of the lower and upper limit values L and U for defining the permission range of the engine speed NE are equal to each other. In other words, the permission range is defined such that the lower and upper limit values are symmetrical to the engine speed NE of zero. However, as a range of the engine speed NE where a cranking of the engine 10 can be carried out by the starter motor 26 without problems including a generation of the vibration and/or the noise and the damage of the starter motor 26, the permission range is not necessarily defined such that the lower and upper limit values are symmetrical with respect to the engine speed NE of zero.

As described above, the problems such as the generation of the vibration and/or the noise and the damage of the starter motor 26 due to the cranking by the starter motor 26 is likely to occur when the crank shaft 24 of the engine 10 rotates in the reverse rotation direction, compared with when the crank shaft 24 of the engine 10 rotates in the normal rotation direction. Thus, in accordance with this modified example, the absolute value of the lower limit value L which is a boundary value at the negative side of the permission range, is set to a value smaller than the absolute value of the upper limit value U which is a boundary value at the positive side of the permission range.

Note that in another type starter motor, a problem such as the vibration due to the cranking may be likely to occur when the crank shaft 24 of the engine 10 rotates in the normal rotation direction, compared with when the crank shaft 24 of the engine 10 rotates in the reverse rotation direction. In this case, the absolute value of the upper limit value U is desirably set to a value smaller than the absolute value of the lower limit value L.

Thereby, the upper and lower limit values U and L can be appropriately set, respectively by setting the absolute values of the upper and lower limit values U and L such that the absolute values are different from each other. As a result, the occurrence of the problems such as the generation of the vibration and/or the noise and the damage of the starter motor 26 due to the cranking by the starter motor 26, can be suppressed without excessively limiting the cranking by the starter motor 26.

<First Device According to Fifth Modified Example>

In the first device according to the first embodiment, the absolute value of the upper value U is equal to the absolute value of the lower value L. In other words, the permission range of the engine speed NE is defined such that the lower and upper limit values are symmetrical to the engine speed NE of zero. In this case, when the extreme value of the engine speed NE detected after the rotation direction of the crank shaft 24 first reverses during the execution of the automatic stop control is within the permission range, the extreme values detected subsequently should be within the permission range (e.g., see FIG. 9(a) to FIG. 9(c)).

Therefore, in the first device according to a fifth modified example, the upper and lower limit values U and L are set such that the absolute values of the upper and lower limit values U and L are equal to each other. The first device according to the fifth modified example calculates only a predicted peak value (i.e., the first predicted peak value) next to the focused peak value and determines whether or not the calculated predicted peak value is within the permission range. Then, when the first predicted peak value is within the permission range, the first device according to the fifth modified example determines that all of the predicted peak values appearing after the first predicted peak value appears will be within the permission range (i.e., the first device determines that there will be no excessive peak value after the first predicted peak value appears). Therefore, according to the fifth modified example, it is possible to reduce a load necessary to calculate the predicted peak values and it is possible to reduce a time necessary to determine whether or not there will be an excessive peak value.

<First Device According to Sixth Modified Example>

On the other hand, in the first device according to the fourth modified example, the lower and upper limit values L and U of the permission range are set such that the absolute value of the lower limit value L is smaller than the absolute value of the upper limit value U. In this case, even when the extreme value of the engine speed NE at a certain time is within the permission range, the extreme value appearing subsequently is always within the permission range.

This matter will be described in detail. For example, in an example illustrated in FIG. 10, the absolute value of the upper limit value U of the permission range is smaller than the absolute value of the lower limit L of the permission range. Under the circumstances, a case where the extreme value of the engine speed NE (see the engine speed NE at a point P0 denoted by a star sign) first detected after the first reverse time (e.g., a time t1) during the execution of the automatic stop control is acquired as a focused peak value, will be described. In this case, the focused peak value is an extreme value of the engine speed NE of the crank shaft 24 rotating in the reverse rotation direction and departs from the permission range (i.e., the focused peak value is smaller than the lower limit value L). Further, in this case, a predicted peak value (see the engine speed NE at a point P1 denoted by a white circle sign) first calculated on the basis of the focused peak value is an extreme value of the engine speed NE of the crank shaft 24 rotating in the normal rotation direction and is within the permission range (i.e., a predicted peak value first calculated is between the lower and upper limit values L and U).

Figure 10:
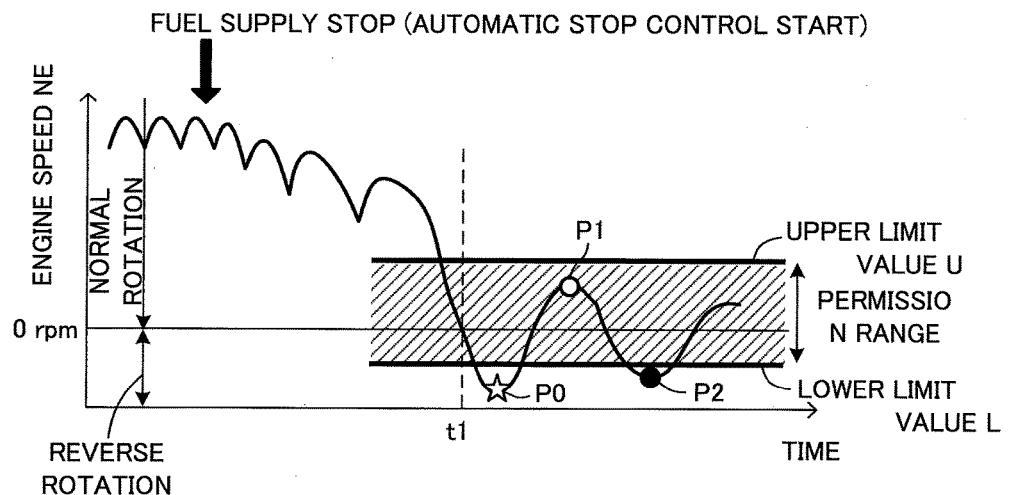
FIG. 10 illustrates a schematic time chart showing an example of a change of the extreme value of the engine speed NE in case that an absolute value of a lower limit value of a permission range is smaller than an absolute value of an upper limit value of the permission range.

As described above, the extreme value of the engine speed NE gradually decays at the constant decay rate α. Therefore, the magnitude (i.e. the absolute value) of the second predicted peak value (see the engine speed NE at a point P2 denoted by a black circle sign) calculated on the basis of the focused peak value is smaller than the magnitude (i.e., the absolute value) of the first predicted peak value (see the engine speed NE at the point P1 denoted by the white circle sign). However, as illustrated in FIG. 10, the absolute value of the lower limit value L of the permission range is smaller than the absolute value of the upper limit value U of the permission range and thus, the second predicted peak value (see the engine speed NE at the point P2 denoted by the black circle sign) departs from the permission range.

As can be understood from this, in case that the absolute value of the upper limit value U of the permission range is different from the absolute value of the lower limit value L of the permission range, even when a certain extreme value of the engine speed NE is within the permission range, an extreme value appearing next to the certain extreme value is not always within the permission range.

Figure 11:
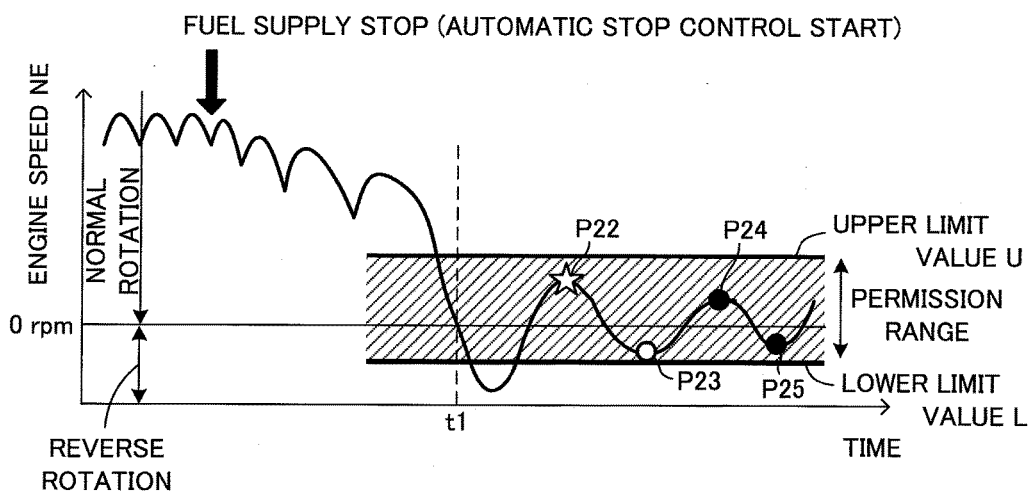
FIG. 11 illustrates a schematic time chart showing another example of the change of the extreme value of the engine speed NE in case that the absolute value of the lower limit value of the permission range is smaller than the absolute value of the upper limit value of the permission range.

On the other hand, FIG. 11 illustrates an example where the second extreme value of the engine speed NE (see the engine speed NE at a point 22 denoted by a star sign) detected after the first reverse time (i.e., the time t1) when the crank shaft 24 is rotating in the normal rotation direction, is acquired as a focused peak value. In this example, a first predicted peak value (see the engine speed NE at a point P23 denoted by a white circle sign) calculated on the basis of the focused peak value is an extreme value of the engine speed NE when the crank shaft 24 is rotating in the reverse rotation direction. Magnitudes of a second predicted peak value (see the engine speed NE at a point P24) and a predicted peak value (see the engine speed NE at a point P25) appearing subsequently after the first predicted peak value are smaller than a magnitude of the first predicted peak value (see the engine speed NE at a point P23). Therefore, when the magnitude of the first predicted peak value (see the engine speed NE at the point P23) is smaller than the magnitude of the lower limit value L (i.e., the first predicted peak value is within the permission range), it can be expected that all of the predicted peak values (see the engine speeds NE at the points P24 and P25) appearing after the first predicted peak value (see the engine speed NE at the point P23) will be within the permission range.

Therefore, when the absolute value of the upper limit value U which is one of the boundary values of the permission range is different from the absolute value of the lower limit value L which is the other boundary value of the permission range, it can be determined that there will be no predicted peak value departing from the permission range appears (i.e., there will be no excessive peak value) when any of following conditions is satisfied.

(a) A first predicted peak value predicted to appear after the focused peak value appears is within the permission range and is within a range from zero to the boundary value of the permission range, which boundary value having a smaller absolute value.

(b) A first predicted peak value predicted to appear after the focused peak value appears is within the permission range and is within a range from zero to the boundary value of the permission range, which boundary value having a larger absolute value and a second predicted peak value predicted to appear after the focused peak value appears is within the permission range.

Therefore, the CPU of the first device according to a sixth modified example determines whether or not any of the conditions (a) and (b) is satisfied when the CPU executes the process of the step S805 in FIG. 8.

Second Embodiment

Below, the control device of the engine according to a second embodiment of the present invention (hereinafter, this control device will be referred to as "the second device") will be described. The second device is the same as the first device except for a method for determining whether or not there will be an excessive peak value (i.e., whether or not any of the predicted peak values will depart from the permission range).

In particular, the second device is configured to determine that there will be an excessive peak value without actually calculating the predicted peak values on the basis of the focused peak value when the magnitude of the focused peak value is equal to or larger than a predetermined determination threshold. On the other hand, the second device is configured to determine that an excessive peak value will not appear without actually calculating the predicted peak values on the basis of the focused peak value when the magnitude of the focused peak value is smaller than the predetermined determination threshold.

As described above, the magnitude of the predicted peak value predicted to appear after the focused peak value can be defined by the expressions (1) and (5) or the expression (7) or the like. Therefore, the determination of whether or not there will be an excessive peak value can be carried out by determining whether or not the magnitude of the focused peak value actually acquired is equal to or larger than a predetermined threshold. In other words, a focused peak value Pth where no excessive peak value appears after the focused peak value Pth appears, is previously acquired and the acquired focused peak value is stored as a determination threshold Pth in the ECU 80. Then, the ECU 80 determines whether or not there will be an excessive peak value by comparing the actual focused peak value with the determination threshold Pth.

Figure 12:
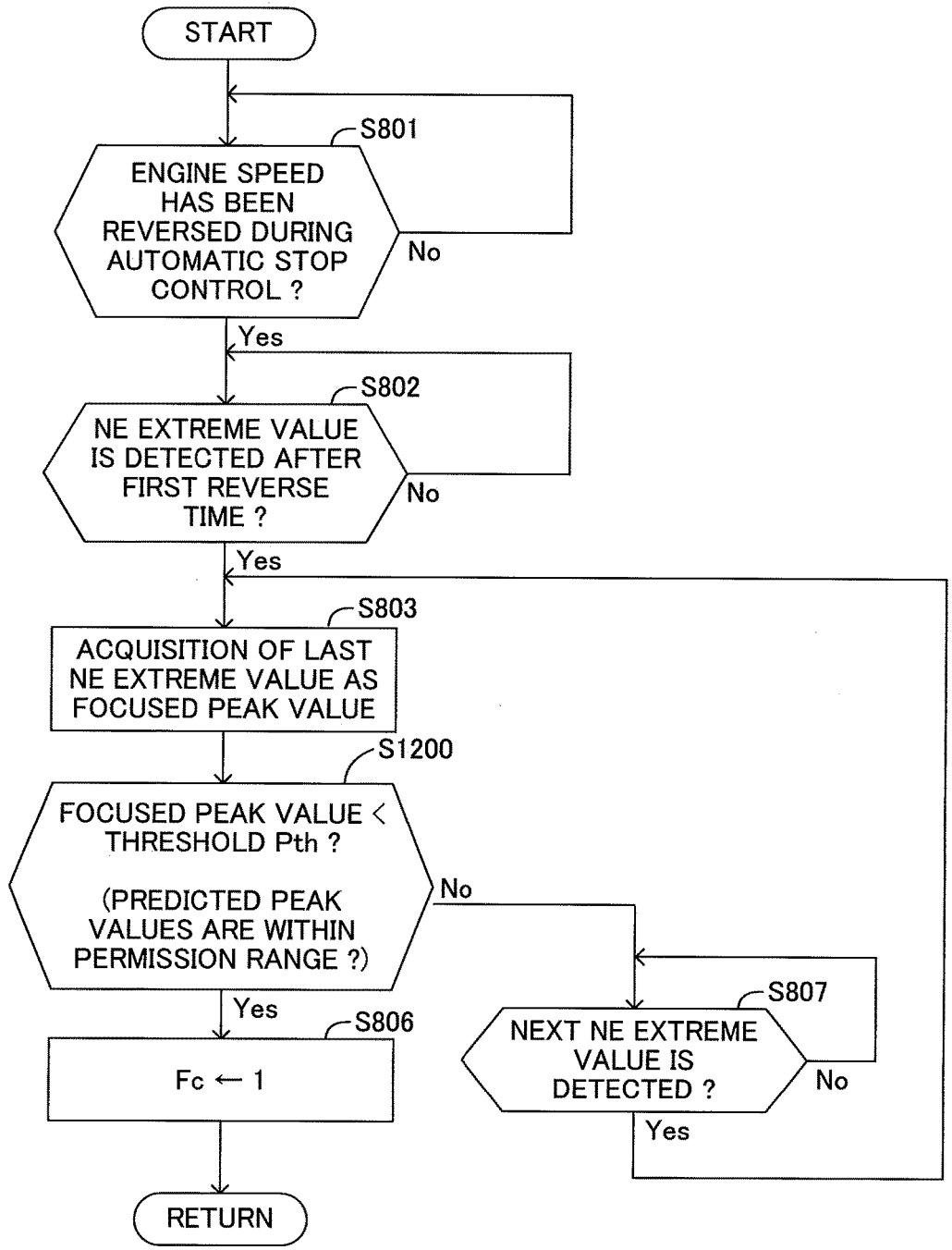
FIG. 12 illustrates a flowchart for describing the operation of the excessive peak determination section of a control device (a second device) according to a second embodiment of the present invention.

On the basis of the point of view described above, the CPU of the second device is programmed (or configured) to execute an excessive peak determination routine illustrated by a flowchart in FIG. 12 with a predetermined time period in place of the routine illustrated in FIG. 8. The routine illustrated in FIG. 12 is the same as the routine illustrated in FIG. 8 except that the steps S804 and S805 in FIG. 8 are replaced with a step S1200. Therefore, below, processes associated with a process of the step S1200 will be described.

After the CPU of the second device acquires a focused peak value at the step S803, the CPU proceeds with the process to the step S1200 to determine whether or not the magnitude of the focused peak value is smaller than the determination threshold Pth memorized/stored in the back-up RAM. At this time, when the magnitude of the focused peak value is smaller than the determination threshold Pth, the CPU determines "Yes" at the step S1200, i.e., the CPU determines that there will be no excessive peak value. Thus, in this case, the CPU proceeds with the process to the step S806 to set the value of the flag Fc to "1".

On the other hand, when the magnitude of the focused peak value is equal to or larger than the determination threshold Pth, the CPU determines "No" at the step S1200, i.e., the CPU determines that there will be an excessive peak value. Thus, in this case, the CPU proceeds with the process to the step S807 to wait until the CPU acquires a next extreme value.

In this manner, the second device can easily determines whether or not it is ensured that the engine speed NE continues to be within the permission range after the focused peak value appears by comparing the magnitude of the focused peak value with the determination threshold Pth.

Note that the determination threshold Pth can be appropriately defined on the basis of the gradient GR or the decay rate $\alpha$ calculated on the basis of the decay pattern of the extreme value of the engine speed NE during the back-and-forth period. For example, as the decay rate $\alpha$ of the extreme value of the engine speed NE increases, the degree of the decay of the magnitude of the extreme value due to the increasing of the appearing number of the extreme value increases. Therefore, a value which increases as the decay rate $\alpha$ increases, is set as the determination threshold Pth. In other words, the determination threshold Pth is a function of the decay rate α (or the decay parameter including the gradient GR).

<Second Device According to Modified Example>

As described above, it is difficult for the second device according to the second embodiment to exactly determine whether or not there will be an excessive peak value when the decay pattern of the extreme value of the actually detected engine speed NE is significantly different from the decay pattern of the extreme value of the engine speed NE used for defining the determination threshold Pth.

The second device according to a modified example is configured to acquire the extreme values of the actual engine speed NE until the operation of the engine 10 is completely stopped by the automatic stop control associating with the appearing number and store the acquired extreme values in the RAM. Then, the second device according to the modified example calculates a decay parameter (e.g., a decay rate α or a gradient GR) again on the basis of the stored data.

Then, the second device according to the modified example calculates a focused peak value which causes no excessive peak value to appear on the basis of the calculated decay parameter. Further, this second device employs the calculated focused peak value as a determination threshold Pth' for a correction and corrects the determination threshold Pth stored at the present time in the back-up RAM by the determination threshold Pth' for the correction. Then, this second device memorizes/stores the corrected determination threshold Pthnew as a new determination threshold Pth in the back-up RAM. In particular, the CPU acquires a corrected determination threshold Pthnew by using a following expression (10). In the expression (10), z is a weight coefficient and is a positive value equal to or smaller than "1".

$$Pth\text{new}=(1-z)\cdot Pth+z\cdot Pth' \quad (10)$$

<Second Device According to Other Modified Example>

Similar to the first device according to the various modified examples described above, the second device may variously be modified. The modifications of the second device are similar to the modifications of the first device and thus, descriptions of the modifications of the second device will be omitted.

The embodiments and modified examples each having a particular configuration have been described for explaining the present invention with reference to the drawings. However, the scope of the present invention is not limited to the exemplary embodiments and modified examples. Any modifications can be appropriately applied to the embodiments and modified examples within the scope defined by the claims and the description.

What is claimed is:

1. A control device for an internal combustion engine, comprising:
   at least a fuel supply system including a pump for supplying a fuel into a combustion chamber;
   at least an ignition device including an ignition plug for igniting the fuel supplied into the combustion chamber;
   a crank shaft;
   an engine speed detection device including a sensor for detecting an engine speed which corresponds to a rotation speed of the crank shaft; and
   a starter for rotating the crank shaft,
   the control device comprising an electronic control unit programmed to execute an automatic stop control for stopping the supply of the fuel from the fuel supply system to stop a rotation of the crank shaft when a predetermined automatic stop condition is satisfied,
   wherein the electronic control unit is programmed:
   to acquire, on the basis of the detected engine speed, a focused peak value which corresponds to an extreme value of the detected engine speed appearing after a first reverse time when a rotation direction of the crank shaft first reverses while the automatic stop control has been executed;
   to determine, on the basis of the acquired focused peak value and a stored gradient, whether there will be an excessive peak value, which is expected to depart from a predetermined permission range in which an operation of the engine can be restarted by rotating the crank shaft with the starter, among predicted peak values each corresponding to an extreme value of the engine speed predicted to appear after the focused peak value appears; and
   to execute a starter start control for driving the starter, restarting the supply of the fuel from the fuel supply system and igniting the fuel by the ignition device to restart the operation of the engine when a predetermined restart condition is satisfied, the detected engine speed is within the predetermined permission range and the electronic control unit has determined that there will be no excessive peak value;
   wherein the electronic control unit is programmed:
   to previously store as the stored gradient, a parameter for specifying a manner of a decay of the extreme value appearing after the first reverse time; and
   to calculate the predicted peak values on the basis of the acquired focused peak value and the stored parameter.

2. The control device for the engine according to claim 1, wherein the electronic control unit is programmed:
   to acquire, on the basis of the detected engine speed, the extreme values of the engine speed appearing after the first reverse time under the state that the starter start control has not been executed;
   to correct the stored parameter on the basis of the acquired extreme values; and
   to store the corrected parameter as a parameter used for calculating the predicted peak values.

3. The control device for the engine according to claim 1, wherein the electronic control unit is programmed:
   to determine that there will be an excessive peak value when a magnitude of the focused peak value is equal to or larger than a predetermined determination threshold; and
   to determined that there will be no excessive peak value when the magnitude of the focused peak value is smaller than the predetermined determination threshold.

4. The control device for the engine according to claim 3, wherein the electronic control unit is programmed:
   to acquire, on the basis of the detected engine speed, the extreme values of the engine speed appearing after the first reverse time under the state that the starter start control has not been executed;
   to correct the predetermined determination threshold on the basis of the acquired extreme values; and
   to execute a threshold learning by storing the corrected predetermined determination threshold as a new threshold used for determining whether there will be an excessive peak value.

5. The control device for the engine according to claim 1, wherein when the rotation speed of the crank shaft rotating in the normal rotation direction is expressed by a positive value and the rotation speed of the crank shaft rotating in the reverse rotation direction is expressed by a negative value, the permission range is a range defined by a lower limit value which is a negative value and an upper limit value which is a positive value and the absolute values of the lower and upper limit values are different from each other.

6. The control device for the engine according to claim 1, wherein the electronic control unit is programmed to start the starter start control when the rotation of the crank shaft is stopped and the restart condition is satisfied.

7. The control device for the engine according to claim 1, the electronic control unit is programmed to restart the operation of the engine by restarting the supply of the fuel by the fuel supply system and igniting the fuel by the ignition device without driving the starter when the restart condition is satisfied under the state that the engine rotates in the normal rotation direction and the magnitude of the engine speed is equal to or larger than a predetermined speed threshold larger than the upper limit value defining the permission range.

* * * * *